US008243561B2

(12) United States Patent
Matsumoto

(10) Patent No.: US 8,243,561 B2
(45) Date of Patent: Aug. 14, 2012

(54) HEAD FOR THERMAL ASSISTED MAGNETIC RECORDING DEVICE, AND THERMAL ASSISTED MAGNETIC RECORDING DEVICE

(75) Inventor: Takuya Matsumoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/025,256

(22) Filed: Feb. 11, 2011

(65) Prior Publication Data
US 2011/0216635 A1    Sep. 8, 2011

(30) Foreign Application Priority Data

Mar. 5, 2010   (JP) ................................. 2010-049511

(51) Int. Cl.
*G11B 13/08*   (2006.01)
(52) U.S. Cl. ..................................... 369/13.33; 360/59
(58) Field of Classification Search ............... 369/13.33; 360/59
See application file for complete search history.

(56) References Cited

U.S. PATENT DOCUMENTS

| 6,768,556  | B1  |   | 7/2004  | Matsumoto et al. |          |
|------------|-----|---|---------|------------------|----------|
| 8,000,178  | B2  | * | 8/2011  | Shimazawa et al. | 369/13.33|
| 8,107,325  | B2  | * | 1/2012  | Komura et al.    | 369/13.33|
| 2004/0085862 | A1 |   | 5/2004  | Matsumoto et al. |          |
| 2008/0002298 | A1 |   | 1/2008  | Sluzewski        |          |
| 2008/0316872 | A1 |   | 12/2008 | Shimizu et al.   |          |
| 2009/0266789 | A1 |   | 10/2009 | Shimazawa et al. |          |
| 2009/0303858 | A1 |   | 12/2009 | Kuiseko et al.   |          |
| 2011/0149698 | A1 |   | 6/2011  | Naniwa et al.    |          |
| 2011/0188356 | A1 |   | 8/2011  | Hirata et al.    |          |

FOREIGN PATENT DOCUMENTS

| JP | 2001-255254   | 9/2001  |
| JP | 2004-151046   | 5/2004  |
| JP | 2009-4030     | 1/2009  |
| JP | 2010-027185   | 2/2010  |
| WO | WO 2007/132766| 11/2007 |
| WO | WO 2009/148012| 12/2009 |
| WO | WO 2010/010823| 1/2010  |

OTHER PUBLICATIONS

Hideki Saga et al., New Recording Method Combining Thermo-Magnetic Writing and Flux Detection, Japanese Journal of Applied Physics, Mar. 1999, pp. 1839-1840, vol. 38, Part 1, No. 3B.

* cited by examiner

*Primary Examiner* — Aristotelis Psitos
(74) *Attorney, Agent, or Firm* — Antonelli, Terry, Stout & Kraus, LLP.

(57) ABSTRACT

In a head for thermal assisted magnetic recording device, a semiconductor laser is mounted so that the total height of the head does not become larger and light power fluctuation due to wavelength fluctuation occurs less frequently. In addition, the rise in temperature of the mounted semiconductor laser is suppressed. A semiconductor laser is placed on a side surface which is different from surfaces on an inflow end side and a trailing side, of four side surfaces of a floating slider. An entrance of a waveguide is placed on the side surface of the floating slider, to thereby cause emitted light from the semiconductor laser to directly enter the waveguide. A curved line part or a reflective mirror is formed in the middle of the waveguide so that the light which has entered the waveguide travels toward an optical near-field generating element.

20 Claims, 34 Drawing Sheets

HEAD FOR THERMAL ASSISTED MAGNETIC RECORDING DEVICE, AND THERMAL ASSISTED MAGNETIC RECORDING DEVICE

CLAIM OF PRIORITY

The present application claims priority from Japanese patent application JP 2010-049511 filed on Mar. 5, 2010, the content of which is hereby incorporated by reference into this application.

BACKGROUND OF THE INVENTION

1. Field of the Invention

The present invention relates to an optical near-field generator and a recording and reproducing apparatus using the same.

2. Background Art

In recent years, a thermally assisted magnetic recording system has been proposed as a recording system which realizes a recording density equal to or larger than 1 Tb/in$^2$ (H. Saga, H. Nemoto, H. Sukeda, and M. Takahashi, Jpn. J. Appl. Phys. 38, Part 1, 1839 (1999)). In a conventional magnetic recording apparatus, when a recording density thereof is equal to or larger than 1 Tb/in$^2$, loss of recorded information due to thermal fluctuation becomes a problem. In order to prevent this problem, it is necessary to increase a coercive force of a magnetic recording medium. However, the magnitude of a magnetic field which can be generated from a magnetic recording head is limited, and hence if the coercive force is excessively increased, it becomes impossible to form recording bits on the medium. In order to solve this, in the thermally assisted magnetic recording system, the medium is heated with light at the moment of recording, to thereby reduce the coercive force. This enables recording on the medium having a high coercive force, and makes it possible to realize the recording density equal to or larger than 1 Tb/in$^2$.

In this thermal assisted magnetic recording device, it is necessary to set a spot diameter of radiated light to a value (several 10 nm) nearly equal to the recording bits. This is because the light erases information in an adjacent track if the spot diameter of the light is larger than this value. In order to heat such a minute region, an optical near-field is used. The optical near-field is an electromagnetic field (light whose wavenumber has imaginary components) which is localized in the vicinity of a minute object equal to or smaller than a light wavelength, and is generated by using a minute opening or a metal scatterer having a diameter equal to or smaller than the light wavelength. For example, JP 2001-255254A proposes an optical near-field generating element which uses a metal scatterer having a triangular shape, as a highly efficient optical near-field generating element. When light is caused to enter the metal scatterer, plasmon resonance is excited in the metal scatterer, so that a strong optical near-field is generated at a vertex of the triangle. The use of this optical near-field generating element makes it possible to highly efficiently collect the light in a region equal to or smaller than several 10 nm. In addition, JP 2004-151046A proposes a structure in which a recess is formed in a portion other than the vertex at which the optical near-field is generated, on a surface of the metal scatterer on an air bearing surface side. This structure makes it possible to reduce the width of intensity distribution of the optical near-field generated at the vertex, and to suppress the occurrence of a weak optical near-field (background light) generated around the opposite side to the vertex.

For the thermally assisted magnetic recording system described above, it is necessary to heat with light the vicinity of a magnetic pole for applying a magnetic field. For this purpose, for example, a waveguide is formed beside the magnetic pole, and the light generated from a semiconductor laser as a light source is guided to the vicinity of a leading end of the magnetic pole. At this time, the semiconductor laser is mounted on the floating slider or is placed at a base of a suspension, and the light is guided therefrom to the floating slider by using the waveguide such as an optical fiber.

As the method of placing the semiconductor laser as the light source on the floating slider, for example, US 2009/0266789A1 proposes a method in which an edge emitting laser is placed so as to stand perpendicularly on an upper surface of the floating slider. In addition, JP 2009-4030A proposes a method in which the semiconductor laser is placed so as to be horizontal to an upper surface of the floating slider, and a mirror is formed on an end surface thereof, to thereby couple emitted light directly to a waveguide formed in the floating slider.

In addition, US 2008/0002298A1 proposes a method of placing the semiconductor laser on a side surface of the slider. In this case, a vertical cavity surface emitting laser is used as the semiconductor laser, and the laser is placed on the side surface of the floating slider on a trailing side. The slider includes a waveguide having a side surface on which a grating coupler is formed, and the light emitted from the semiconductor laser is coupled to the waveguide via the grating coupler.

SUMMARY OF THE INVENTION

When the semiconductor laser is placed on the upper surface of the floating slider, the total height thereof becomes larger according to the height of the placed semiconductor laser. If the height becomes larger as described above, the floating of the slider becomes unstable, for example, when an impact is applied to a drive. In addition, in order to increase a recording capacity, it is necessary to dispose a plurality of disks and a head in the drive. However, when the total height of the head becomes larger, it is accordingly necessary to increase an interval between the disks, so that the total thickness of the drive becomes larger. On the other hand, in order to keep the thickness of the drive small, it is necessary to reduce the number of the disks. In this case, the recording capacity is decreased.

In the case where the semiconductor laser is placed on the side surface of the slider, because it is not necessary to place the semiconductor laser on top of the slider, the problem of the total height of the head is eliminated. However, it is necessary to cause light to enter from the side surface of the waveguide, and hence the grating coupler needs to be utilized. The grating coupler is largely dependent on a wavelength, and hence when the wavelength of the semiconductor laser is changed by a change in environmental temperature or the like, the intensity of the light coupled to the waveguide fluctuates. In addition, the trailing side of the slider is normally covered by an alumina film having a thickness equal to or larger than 30 micrometers (it is necessary to cover a periphery of a magnetic head by the alumina film). Accordingly, the semiconductor laser is placed on the thick alumina film. In this case, the heat generated by the semiconductor laser is dissipated less easily, and hence temperature of the semiconductor laser considerably rises, so that the semiconductor laser is damaged or the lifetime thereof is shortened.

The present invention has an object to provide, in the case where a semiconductor laser is mounted on a floating slider, means for placing the semiconductor laser so that the total height of a head is small, wavelength fluctuation of the semiconductor laser is less influential, and the rise in temperature of the semiconductor laser is suppressed.

In order to achieve the above-mentioned object, according to the present invention, an edge emitting semiconductor laser is used as a semiconductor laser, and is placed next to a side surface which is different from surfaces on a leading side and a trailing side, of four side surfaces of a floating slider. An entrance of a waveguide formed in the floating slider is located on the side surface side of the slider on which the semiconductor laser is placed, and emitted light from the semiconductor laser is directly coupled to an end surface of the waveguide. The waveguide formed in the slider includes a curved line part, and the light being transmitted through the waveguide is caused to travel in a direction toward an optical near-field generating element.

In the structure according to the present invention, the semiconductor laser is formed on the side surface of the floating slider, and hence the total height of a head can be kept small. Accordingly, it is possible to prevent the floating thereof from becoming unstable, and it is not necessary to increase an interval between disks in a drive, so that a thickness of the entire device can be kept as small as conventional cases. In addition, when the light from the semiconductor laser is coupled to the waveguide, it is not necessary to use a grating coupler. Accordingly, the intensity of the light coupled to the waveguide is not fluctuated by wavelength fluctuation.

The semiconductor laser is placed on a sub-mount, and the sub-mount is bonded to the side surface of the slider by using a conductive adhesive agent. The heat generated by the semiconductor laser is transmitted to the sub-mount, and then is transmitted to the floating slider. The heat transmitted to the slider is released to the recording disk side via an airflow flowing between the air bearing surface and the recording disk. As a result, it is possible to suppress the rise in temperature of the semiconductor laser. As a result, it is possible to prevent damage to the semiconductor laser and shortening of the lifetime thereof. The sub-mount and a flexure part of a suspension may be bonded to each other by using the conductive adhesive agent. With this configuration, the heat is dissipated also to the suspension, and hence the rise in temperature of the semiconductor laser can be further reduced. At this time, if a surface of the flexure part of the suspension is covered by a film made of a material having a high thermal conductivity such as metal, the heat is dissipated more easily, and the temperature can be further dropped.

A TE mode laser is used as the semiconductor laser, and is placed so that a bonding surface between the laser and the sub-mount is parallel to a slider air bearing surface. At this time, when light is transmitted through the waveguide including the curved line part, the propagation direction thereof changes, and hence the polarization direction thereof becomes parallel to a recording track near the optical near-field generating element.

When a radius of curvature of the curved line part of the waveguide is excessively small, light is released from the waveguide, so that propagation loss occurs. In order to prevent the propagation loss from occurring, it is preferable to set the radius of curvature of the waveguide to be equal to or larger than 60 μm.

In order to bend the traveling direction of the light inside of the waveguide, a reflective mirror may be provided in the middle of the waveguide. In this case, the light is totally reflected by a reflection surface, and alternatively, a metal film is formed on the reflection surface, to thereby reflect the light.

In order to efficiently couple the emitted light from the semiconductor laser to the waveguide, a spot size converter is formed at the entrance of the waveguide. The use of the structure according to the present invention makes it possible to make a length of the spot size converter larger than in the case where the semiconductor laser is placed in a slider upper part or in the case where the semiconductor laser is placed on the trailing side of the slider and light is coupled to the waveguide by a grating coupler. That is, in the case where the semiconductor laser is placed in the slider upper part or in the case where the semiconductor laser is placed on the trailing side of the slider and light is coupled to the waveguide by the grating coupler, the orientation of the spot size converter is perpendicular to the air bearing surface. In this case, the length of the spot size converter cannot be made larger than a height of the slider (a width in a direction perpendicular to the air bearing surface). On the other hand, in the structure according to the present invention, the orientation of the spot size converter is parallel to a lateral direction of the slider. A width of the slider in the lateral direction is equal to or larger than twice the height of the slider, and hence the length of the spot size converter can be made larger than when the spot size converter is perpendicularly placed. As the length of the spot size converter is larger, it is possible to make larger a conversion ratio of spot diameters (a ratio of a mode field diameter at the entrance of the spot size converter to a mode field diameter at an exit thereof), and hence the mode field diameter at the entrance of the waveguide can be made larger. When the mode field diameter can be made larger as described above, it is possible to enhance the coupling efficiency between the semiconductor laser and the waveguide. As a result, the power of the semiconductor laser can be reduced, so that power consumption and an amount of heat generation can be decreased. In addition, an allowable width for a displacement amount of the semiconductor laser becomes larger, and hence it is possible to increase the yield at the time of assembly, to thereby reduce the manufacturing costs.

The optical near-field generating element and the magnetic head may be brought closer to the opposite side to the side surface on which the semiconductor laser is placed. This makes it possible to make larger the length of the spot size converter, and hence it is possible to make larger the conversion ratio of spot diameters.

Two electrodes are formed on the sub-mount, and are bonded to electrodes of the semiconductor laser by using solders. The semiconductor laser is placed on a surface of the sub-mount on the recording disk side. The electrodes on the sub-mount are exposed on a side surface of the sub-mount on the trailing side, and the electrodes for the semiconductor laser are arranged next to electrode pads for the magnetic head. Similarly to the electrodes for the magnetic head, the electrodes for the semiconductor laser are connected to wiring on a flexible printed circuit formed on the suspension by using solders. As described above, the electrodes for the semiconductor laser and the electrodes for the magnetic head are aligned with each other, which makes it possible to perform at the same time the soldering of the electrodes for the laser and the soldering of the electrodes for the magnetic head. Accordingly, the number of assembly steps can be reduced, so that the manufacturing costs can be also reduced.

The electrodes on the sub-mount may be bonded to the wiring on the flexible printed circuit formed on the suspension, on a side surface of the sub-mount on the opposite side to a light emitting end of the semiconductor laser or on a surface of the sub-mount on the opposite side to the surface on which the semiconductor laser is placed.

The semiconductor laser may be placed on a surface of the sub-mount on the suspension side (on the opposite side to the slider air bearing surface). In this case, the electrodes on the sub-mount and the electrodes of the semiconductor laser are connected to wiring placed between the electrodes and the flexure part. At this time, the electrodes on the sub-mount or the electrodes of the semiconductor laser may be used as a ground to be electrically connected to the flexure part (to be bonded thereto by using solders or a electrically conductive adhesive). This allows the heat generated by the semiconductor laser to be transmitted also to the flexure part, and hence the rise in temperature of the semiconductor laser can be suppressed.

The wiring connected to the electrodes on the sub-mount and the electrodes of the semiconductor laser may be placed so as to pass between the flexure part and the slider. At this time, the wiring is laid out so as to extend over an entire upper surface of the slider (a surface opposite to the air bearing surface), whereby the wiring functions as a heat sink. As a result, the rise in temperature of the semiconductor laser can be suppressed. In particular, the electrodes on the sub-mount or the electrodes of the semiconductor laser are used as the ground, and the wiring and the upper surface of the slider are brought into contact with each other, whereby the heat is dissipated to the slider. Therefore, the rise in temperature can be further reduced.

A surface of the wiring connected to the semiconductor laser is covered by polyimide, and polyimide is removed at a portion at which the wiring is in contact with the electrodes and the upper surface of the slider, to thereby expose the wiring. At this time, ends of the portion at which the wiring is exposed are located on the inner side with respect to ends of the electrodes and the upper surface of the slider. A solder or a electrically conductive adhesive is applied to the portion at which the wiring is exposed, and the wiring is thus bonded to the electrodes and the upper surface of the slider, which makes it possible to prevent the solder or the electrically conductive adhesive from overflowing from the electrodes and the upper surface of the slider.

The semiconductor laser may be attached to the sub-mount so that the surface of the semiconductor laser in contact with the sub-mount is perpendicular to the slider air bearing surface. In this case, when a TM mode laser is used, the polarization direction of the light entering the optical near-field generating element is parallel to the recording track. On the other hand, when a TE mode laser is used, the polarization direction of the light entering the optical near-field generating element is perpendicular to the recording track. In this case, such an optical near-field generating element that is capable of functioning even when the polarization direction of the entering light is perpendicular to the recording track is used, and for example, a metal structure having a shape in which a width gradually becomes smaller toward the direction perpendicular to the recording track is used as the optical near-field generating element.

It is preferable that an anti-reflective coating be formed on the side surface of the slider. When light reaches the side surface of the slider, if the light reflected by the side surface thereof returns to the laser, the power of the laser fluctuates. The return light is reduced by forming the anti-reflective coating, so that the power fluctuation of the laser can be suppressed.

In order to reduce the amount of the light reflected by the side surface of the slider, a gap between an end surface of the semiconductor laser and the side surface of the slider may be filled with a light transmissive resin having a refractive index larger than 1. With this configuration, a difference in refractive index on the side surface of the slider becomes smaller, and hence the reflectance can be reduced. In addition, degradation of the light emitting end surface of the semiconductor laser can be prevented.

In order to reduce the light which returns to the semiconductor laser, the semiconductor laser may be obliquely placed so that the emitted light from the semiconductor laser obliquely enters the side surface of the slider, that is, an angle formed by the direction of the emitted light from the semiconductor laser and a normal line to the side surface of the slider is larger than 0. At this time, in order to sufficiently reduce the return light, it is preferable that the angle formed by the direction of the emitted light from the semiconductor laser and the normal line to the side surface of the slider be made larger than ½ a beam divergence angle (full width at half maximum) of the emitted light from the semiconductor laser.

In order to reduce the amount of the light reflected by the side surface of the slider, instead of obliquely placing the semiconductor laser, the side surface of the slider may be slanted with respect to the air bearing surface, that is, an angle formed by the normal line to the side surface of the slider and a normal line to the slider air bearing surface may be made different from 90 degrees. At this time, in order to sufficiently reduce the return light, it is preferable that the angle formed by the direction of the emitted light from the semiconductor laser and the normal line to the side surface of the slider be made larger than ½ the beam divergence angle (full width at half maximum) of the emitted light from the semiconductor laser.

A terminal end surface of a terminal end part of the waveguide may be slanted with respect to the slider air bearing surface. This prevents the light reflected by the terminal end part of the waveguide formed in the slider from returning to the semiconductor laser, and hence the occurrence of return light noise can be suppressed. In addition, when light is totally reflected by the terminal end surface of the terminal end part of the waveguide, it is possible to prevent part of the light being transmitted through the waveguide, which is not converted into an optical near-field, from entering a medium.

In order to prevent the light reflected by the terminal end part of the waveguide, the orientation of a central axis of the waveguide near the terminal end part of the waveguide may be slanted with respect to the slider air bearing surface, that is, an angle formed by the central axis of the waveguide and the normal line to the slider air bearing surface may be larger than 0. At this time, in order to enhance the generation efficiency of the optical near-field, the optical near-field generating element may have a left-right asymmetrical shape.

When the semiconductor laser is mounted on one side surface of the slider, if the center of gravity moves to the semiconductor laser side, to thereby make the floating of the slider unstable, a weight for balance adjustment may be placed on the opposite side to the side on which the semiconductor laser is mounted.

In the middle of the waveguide for introducing light to the optical near-field generating element, a waveguide for extracting part of the light may be formed in the slider, and a light detector for detecting the light emitted from this waveguide may be placed on the side surface of the slider on the opposite side to the side on which the semiconductor laser is placed. The intensity of the output light from the semiconductor laser fluctuates when environmental temperature changes. In addition, if the drive is used over a long term, the output intensity is gradually reduced by degradation of the semiconductor laser. In addition, the position of the semiconductor laser with respect to the waveguide may be changed by the change in environmental temperature or a long-term use. There is a possibility that these factors fluctuate the intensity of the light coupled inside of the waveguide. If the light intensity fluctuates, the rise in temperature of the recording medium changes, so that stable recording becomes difficult. A feedback circuit is formed for increasing a current fed to the semiconductor laser when the amount of light is small, and reducing the current fed to the semiconductor laser when the amount of light is large, on the basis of the intensity of the light detected by the light detector, whereby the intensity of the light inside of the waveguide can be kept constant, to thereby enable stable recording.

The amount of light may be monitored in the following manner. That is, the orientation of the central axis of the waveguide for introducing light to the optical near-field generating element near the terminal end part thereof is slanted with respect to the slider air bearing surface, the light reflected by the terminal end part of the waveguide is collected by a second waveguide, and the amount of the light emitted from the second waveguide is detected. This eliminates the need to bifurcate the waveguide for introducing light to the optical near-field generating element in the middle thereof, and hence the amount of the light introduced to the optical near-field generating element can be increased.

The light detector may be attached to the side surface of the slider, or may be integrated on the flexible printed circuit on the suspension. In the case where the light detector is integrated on the flexible printed circuit on the suspension, a step of attaching a photodiode to the side surface of the slider can be omitted, and hence it is possible to reduce the assembly time and costs.

In order to inspect the performance of the manufactured head, a waveguide which is placed so as to join the waveguide for introducing light to the optical near-field generating element may be formed in the slider so that an entrance of this waveguide is located on a surface opposite to the slider air bearing surface. This makes it possible to place an objective lens on the opposite side to the slider air bearing surface to thereby introduce light to the waveguide, and hence the inspection is facilitated.

The positions of the semiconductor laser and the waveguide formed in the slider are adjusted with each other by using an alignment apparatus, in which the sub-mount on which the laser is mounted and the slider are placed respectively on two vacuum adsorption stages arranged side by side, and one of the stages is moved, to thereby adjust the positions. At this time, in order to recognize the position of the entrance of the waveguide, alignment marks are formed on both sides of the entrance of the waveguide on the side surface of the slider. In addition, in order to recognize the position of the light emitting part of the semiconductor laser, protrusions are formed as alignment marks on both sides of an active layer of the semiconductor laser. The position adjustment may be performed by observing the positions of the alignment marks thus formed, or may be performed by causing the semiconductor laser to emit light and monitoring the amount of the light emitted from the waveguide.

A vertical cavity surface emitting laser may be used as the semiconductor laser instead of the edge emitting laser.

According to the present invention, the semiconductor laser can be placed on the side surface of the floating slider, and hence it is not necessary to increase the total height of the head. Accordingly, the floating stability of the slider increases. In addition, it is not necessary to increase the interval between the disks in the drive, and hence the thickness of the drive can be kept small. In addition, light is directly introduced from the side surface of the slider to the end surface of the waveguide, and hence light wavelength fluctuation is less influential. In addition, the sub-mount on which the semiconductor laser is mounted is in contact with the side surface of the slider or the flexure part of the suspension, and hence the heat generated by the semiconductor laser is dissipated to the slider and the suspension, so that the rise in temperature near the semiconductor laser can be reduced.

BRIEF DESCRIPTION OF THE DRAWINGS

FIG. 2A is a cross sectional side view observed from an trailing side thereof, and FIG. 2B is a side view observed from a side surface side on which a semiconductor laser is placed.

FIG. 9A is a view illustrating an example in which a step part is vertical, and FIG. 9B is a view illustrating an example in which the step part is slanted.

FIG. 11A is a view illustrating an example in which the electrodes are formed on a side surface opposite to a light emitting part of the semiconductor laser, and FIG. 11B is a view illustrating an example in which the electrodes are formed on a surface opposite to a surface on which the semiconductor laser is mounted.

FIG. 13A is an overall view, and FIG. 13B is a view observed from a side surface side of a slider.

FIG. 14A is a view illustrating an example in which the wiring of the semiconductor laser is placed on one side of the slider, and FIG. 14B is a view illustrating an example in which the wiring of the semiconductor laser is placed so as to pass over the slider.

FIG. 18A is a view illustrating an example in which a vertex at which an optical near-field is generated is located near an end of a main pole, and the optical near-field generating element and the main pole are arranged side by side, FIG. 18B is a view illustrating an example in which the vertex at which the optical near-field is generated is located near an end of the main pole, and positions of the optical near-field generating element and the main pole are deviated from each other, FIG. 18C is a view illustrating an example in which the vertex at which the optical near-field is generated is located at the center of the main pole, FIG. 18D is a view illustrating an example in which a corner of the main pole is cut out, FIG. 18E is a view illustrating an example in which a shape of a metal structure is an isosceles triangle, and FIG. 18F is a view illustrating an example in which two metal structures are formed in the vicinity of the main pole.

FIG. 19A is a view illustrating an example in which the metal structure is placed near the center of a waveguide core, FIG. 19B is a view illustrating an example in which the metal structure is placed at an end part of the waveguide core, and FIG. 19C is a view illustrating an example in which the metal structure is placed next to the waveguide core.

FIG. 20A is a view illustrating an example in which a light transmissive resin is sealed between the semiconductor laser and the side surface of the slider, and FIG. 20B is a view illustrating an example in which the semiconductor laser is obliquely placed.

FIG. 21A is a view illustrating an example in which a width of the slider on the air bearing surface side is made smaller, and FIG. 21B is a view illustrating an example in which a width of the slider on the opposite side to the air bearing surface is made smaller.

FIG. 22A is a view illustrating an example in which a material around the terminal end part is the same as that of a cladding, and FIGS. 22B and 22C are views each illustrating an example in which the material around the terminal end part is different from that of the cladding.

FIG. 25A is an overall view, FIG. 25B is a view illustrating an example in which a mirror utilizing total reflection of light is used, and FIG. 25C is a view illustrating an example in which a mirror utilizing a metal film is used.

FIG. 26A is an overall view, FIG. 26B is a view illustrating an example in which the entire optical near-field generating element is slanted, and FIG. 26C is a view illustrating an example in which a leading end part of the optical near-field generating element is slanted.

FIG. 28A is an overall view, FIG. 28B is a view illustrating an example of a bifurcation part of the waveguides, FIG. 28C is a view illustrating an example in which an end part of a terminal end part of the waveguide for light power monitoring is slanted, and FIG. 28D is a view illustrating an example in which a central axis of the waveguide for light power monitoring is slanted with respect to the side surface of the slider.

FIG. 32A is a view illustrating an example in which light is introduced by using an optical fiber, and FIG. 32B is a view illustrating an example in which light is introduced by using a lens and a mirror.

FIG. 33A is an overall view, FIG. 33B is a view illustrating an example of a confluence part of the waveguides, and FIG. 33C is a view illustrating an example in which both of the waveguide for the head inspection and the waveguide for power monitoring are formed.

FIG. 35A is a view illustrating an example of alignment marks formed on the side surface of the slider, FIG. 35B is a view illustrating an example of alignment marks on the semiconductor laser with a cover layer not being provided, and FIG. 35C is a view illustrating an example of the alignment marks on the semiconductor laser with the cover layer being provided.

DETAILED DESCRIPTION OF THE PREFERRED EMBODIMENTS

Hereinafter, embodiments of the present invention are described with reference to the drawings.

Figure 1:
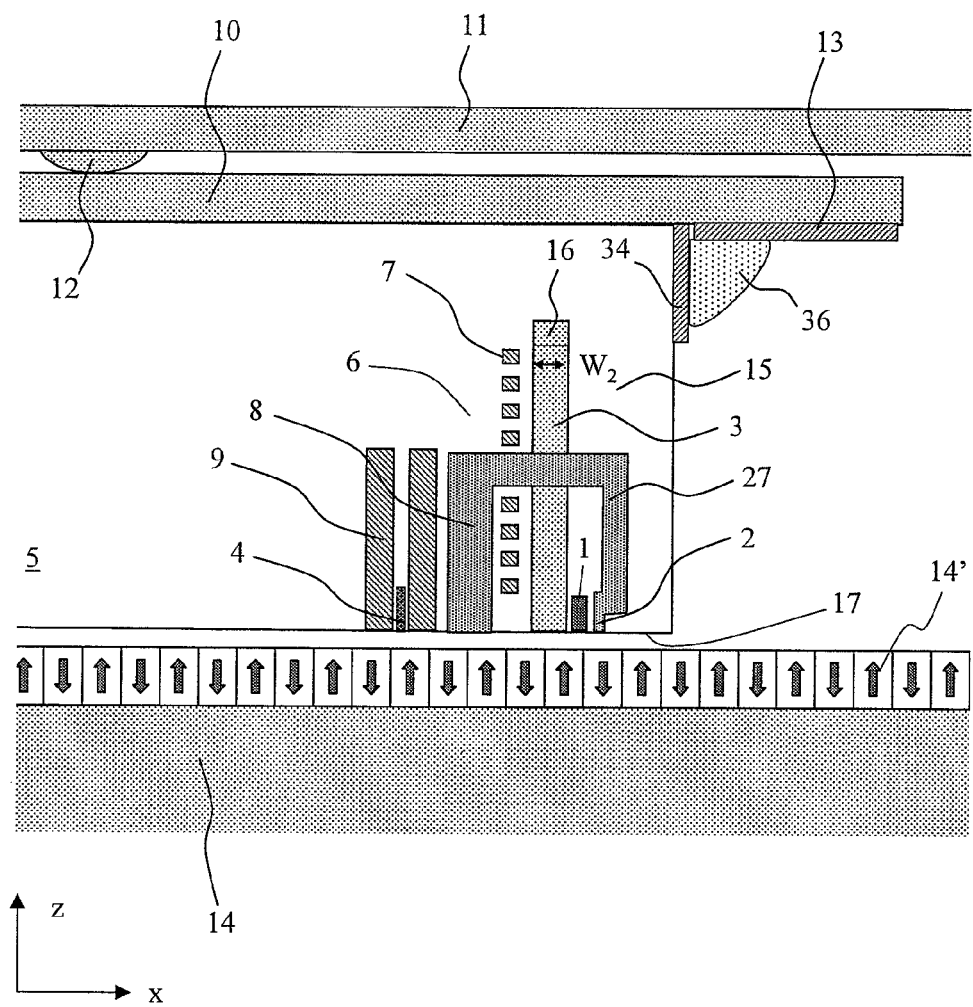
FIG. 1 is a cross sectional side view illustrating a head for thermal assisted magnetic recording device according to the present invention.

FIGS. 1 to 6 each illustrate a configuration example of a head for thermal assisted magnetic recording device according to the present invention. As illustrated in FIG. 1, a magnetic field for recording is generated by a coil 7 and a magnetic head part 6, and the magnetic head part 6 includes a thick magnetic pole 27 for transmitting a magnetic flux generated by the coil 7, a main pole 2, and a return pole 8. The magnetic field generated by the coil 7 is transmitted through the thick magnetic pole 27 to reach the main pole 2 placed in the vicinity of an optical near-field generating element 1. At the moment of recording, a magnetic recording medium 14 is heated by an optical near-field generated by the optical near-field generating element 1, and at the same time, a magnetic field for recording generated by the main pole 2 is applied to the magnetic recording medium 14, whereby a recording mark is written in a recording layer 14'. The magnetic head and the optical near-field generating element are fabricated in a slider that attached to a suspension with a flexure 10, a load beam 11 and a dimple 12.

Figure 4:
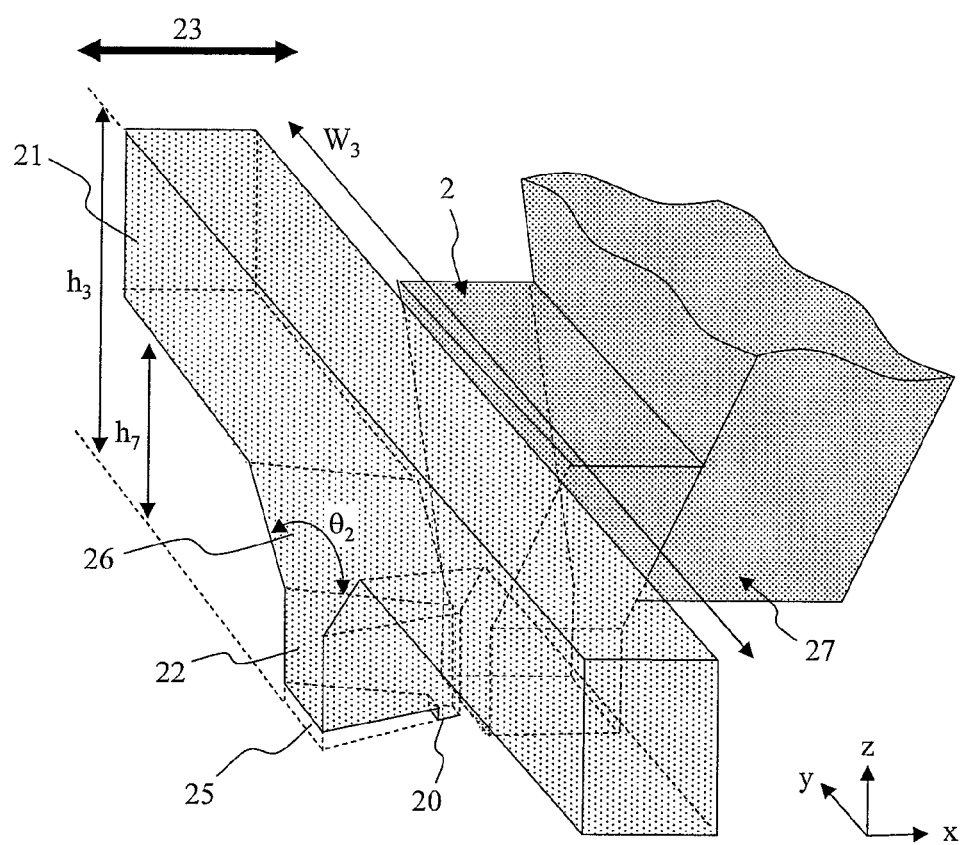
FIG. 4 is a view illustrating a portion of a main pole leading end and an optical near-field generating element.
Figure 5:
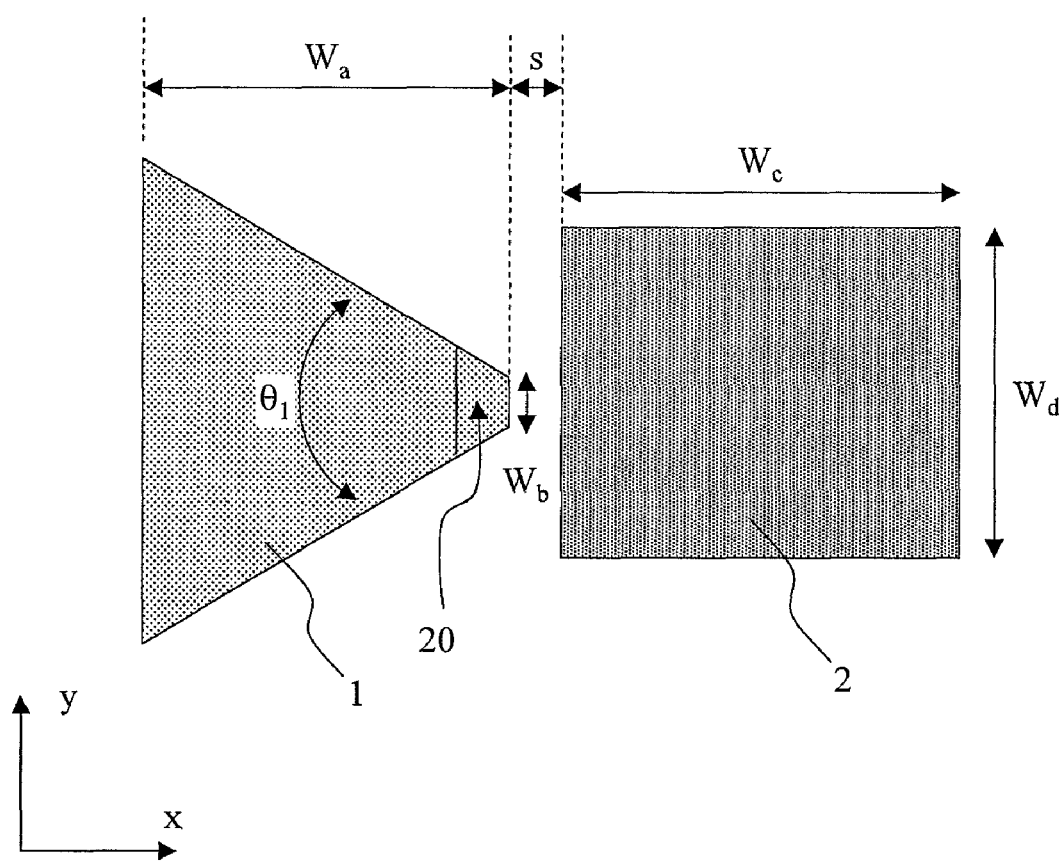
FIG. 5 is a cross sectional view illustrating the portion of the main pole leading end and the optical near-field generating element, which is observed from a air bearing surface side.

FIG. 4 is an enlarged view illustrating the main pole 2 and the optical near-field generating element 1. In addition, FIG. 5 is a view observed from an air bearing surface side. With regard to the magnetic poles, the main pole 2 is formed at an end of the thick magnetic pole 27 for transmitting the magnetic flux generated by the coil 7. A leading end of the main pole 2 is made thinner, widths ($W_c$, $W_d$) of the leading end part of the main pole in x, y directions are set to $W_c$=150 nm and $W_d$=100 nm, and a height (throat height) $h_{10}$ of the thinner portion is set to 50 nm. A width of a portion above the thinner portion is made gradually larger, and an angle φ of this tapered part is set to 45 degrees. A height ($h_4$) of the main pole is set to 900 nm. A distance ($h_{12}$) between the thick magnetic pole 27 and a slider air bearing surface 17 is set to 100 nm. An alloy of NiFe or CoFe is used as a material of the magnetic poles. The use of such a structure makes it possible to concentrate the magnetic field generated by the coil in a narrow region, so that a strong magnetic field equal to or larger than 10 kOe can be generated at a position heated with light.

As illustrated in FIG. 1, a reproducing head including a magnetic reproducing element 4 is formed beside the writing head. In the present embodiment, a Giant Magneto Resistive (GMR) element or a Tunneling Magneto Resistive (TMR) element is used as the magnetic reproducing element 4. A magnetic shield 9 for preventing leakage of the magnetic field is formed around the magnetic reproducing element 4.

A metal structure 1 is used as the optical near-field generating element, and the metal structure 1 has a configuration as illustrated in FIG. 4 and FIG. 5 in which a shape observed from the slider air bearing surface becomes gradually smaller in width toward a vertex 20 at which the optical near-field is generated (in the present embodiment, a triangle), and also has a configuration as illustrated in FIG. 4 in which a shape observed from a side surface of a slider has a width $W_3$ larger in a slider upper part 21 and becomes smaller in width in a slider lower part 22. A tapered part 26 is formed between the upper part 21 having a larger width and the lower part 22 having a smaller width. A length $W_a$, a vertex angle $\theta_1$, and a leading end width $W_b$ of the bottom part having the triangular shape are set to 80 nm to 100 nm, 60 degrees, and 10 nm, respectively, and a distance s between the vertex 20 at which the optical near-field is generated and the main pole is set to 20 to 30 nm. A height $h_3$ of the metal structure 1 is set to 700 nm, the width $W_3$ of the upper part thereof is set to 3 μm, and a distance $h_7$ between the air bearing surface and the upper part having the larger width is set to 250 nm. A vertex angle $\theta_2$ of the tapered part 26 is set to 60 degrees. Gold is used as a material of the metal structure 1, and alumina ($Al_2O_3$) is used as a material around the metal structure 1.

Figure 6:
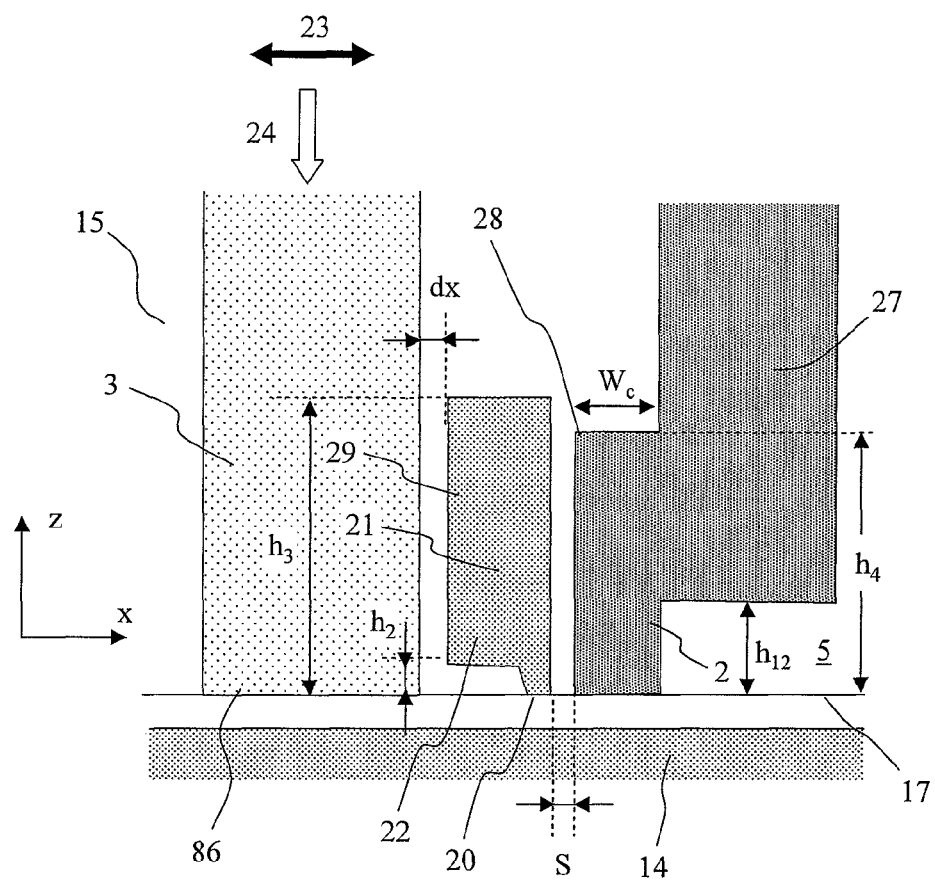
FIG. 6 is a cross sectional view illustrating the portion of the main pole leading end and the optical near-field generating element, which is observed from a side surface side.

In order to guide the light generated by a light source to the optical near-field generating element, a waveguide 3 (a core part thereof is illustrated in the drawings) is used. As illustrated in FIG. 6, the waveguide core 3 is placed next to the metal structure 1. A distance (dx in FIG. 6) between the waveguide core 3 and the metal structure 1 is set to 40 nm. Evanescent light which is generated so as to seep from a cladding 15 exists at an interface between the waveguide core 3 and the cladding 15. If the evanescent light reaches a side surface 29 of the upper part 21 of the metal structure 1, surface plasmons which are a compression wave of electric charges are generated at the interface between the metal structure 1 and the cladding 15. This wave travels in a downward direction (a direction toward a leading end part 20 of the metal structure 1), and when this wave reaches the lower part 22 having the smaller width in the bottom part of the metal structure 1, localized plasmons are generated in the lower part 22 having the smaller width in the bottom part of the metal structure 1. In the lower part 22 having the smaller width in the bottom part of the metal structure 1, the electric charges oscillating inside of the metal concentrate on the sharp pointed leading end part 20, and a localized electromagnetic field, that is, an optical near-field is generated in the vicinity of the leading end part 20. In particular, when the magnetic recording medium 14 is located in the vicinity of the optical near-field generating element 1, the electric charges inside of the metal interact with image electric charges inside of the medium, and thus are further attracted to the medium side, so that a strong optical near-field is generated at the vertex 20 located near the medium.

In the above-mentioned structure, the width of the upper part 21 of the metal structure 1 when being observed from the side surface of the slider is made larger, and the tapered part 26 is provided. With this configuration, the surface plasmons generated in the upper part 21 of the metal structure 1 concentrate on the lower part 22 having the smaller width in the bottom part of the metal structure. As a result, an electromagnetic field strength in the bottom part of the metal structure becomes higher, and a generation efficiency of the optical near-field generated at the vertex 20 can be enhanced.

In the above-mentioned structure, for a portion (25 in FIG. 4) other than the vertex 20 on a surface of the metal structure 1 on the medium side, a distance between a surface of a scatterer and a surface of the medium is set to be larger than a distance between the vertex 20 of the scatterer and the surface of the medium. When light is caused to enter the scatterer, in addition to the vertex 20, a weak optical near-field (background light) is generated also around the opposite side to the vertex. If this background light reaches the medium, the medium is heated also at the portion other than the vertex 20, and recorded information at this portion may be erased. When the bottom surface 25 of the metal structure 1 is shaved so that the distance between the bottom surface 25 of the metal structure 1 and the surface of the medium is large as described above, the weak optical near-field generated around the opposite side to the vertex 20 does not reach the surface of the medium, whereby an influence of the optical near-field on the medium can be reduced. In the present embodiment, a dent (recess) amount $h_2$ of the bottom surface 25 is set to 10 nm.

In the above-mentioned structure, in order to excite surface plasmons at the interface between the metal structure 1 and the cladding 15, it is necessary to radiate light having electric field components perpendicular to the interface to the side surface of the metal structure 1. In general, in order to excite surface plasmons on a surface of a metal film, it is necessary to cause light having electric field components perpendicular to the film surface to enter the film. For this purpose, it is necessary to make a polarization direction of the light introduced to the waveguide core 3 coincide with a direction perpendicular to the interface between the metal structure 1 and the cladding 15 (a direction indicated by an arrow 23 in FIG. 6).

Figure 2A:
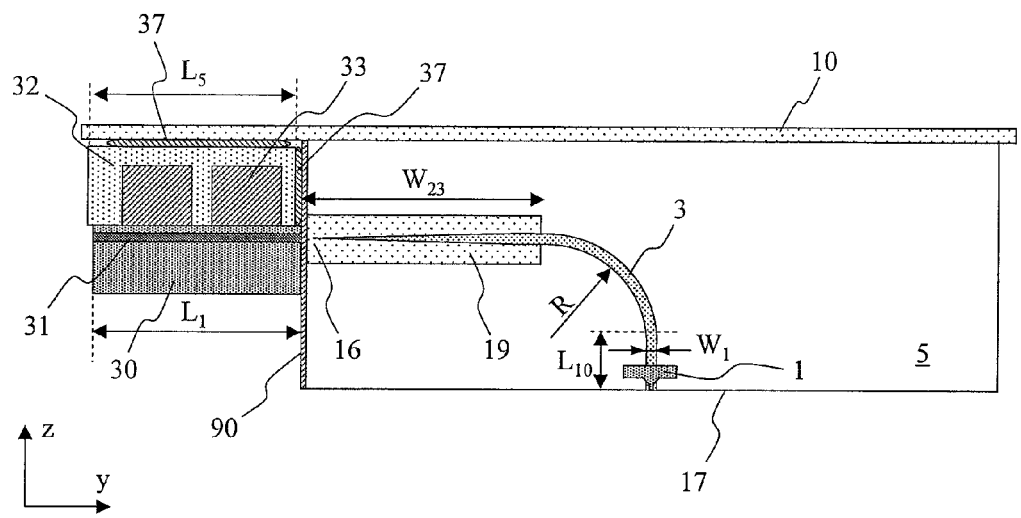
FIGS. 2A and 2B are views each illustrating the head for thermal assisted magnetic recording device according to the present invention.
Figure 2B:
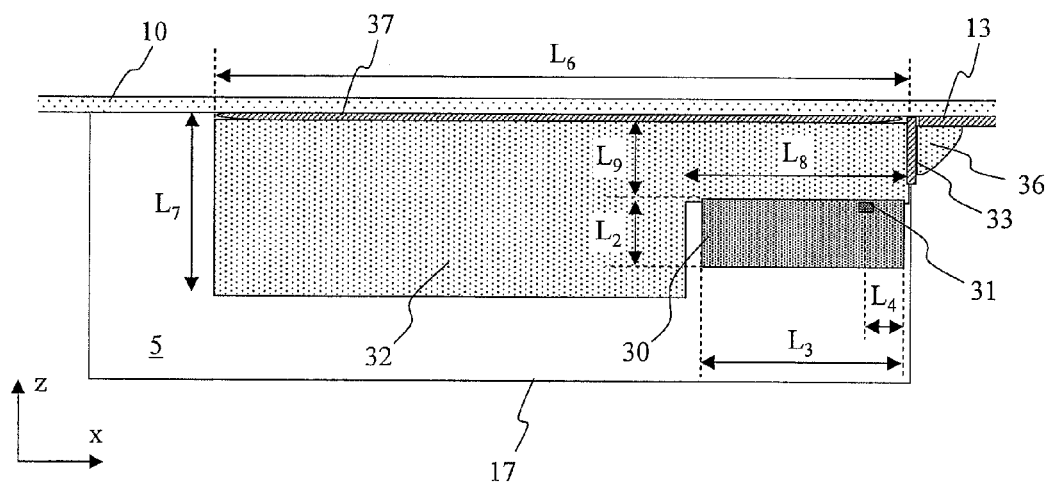
Figure 3:
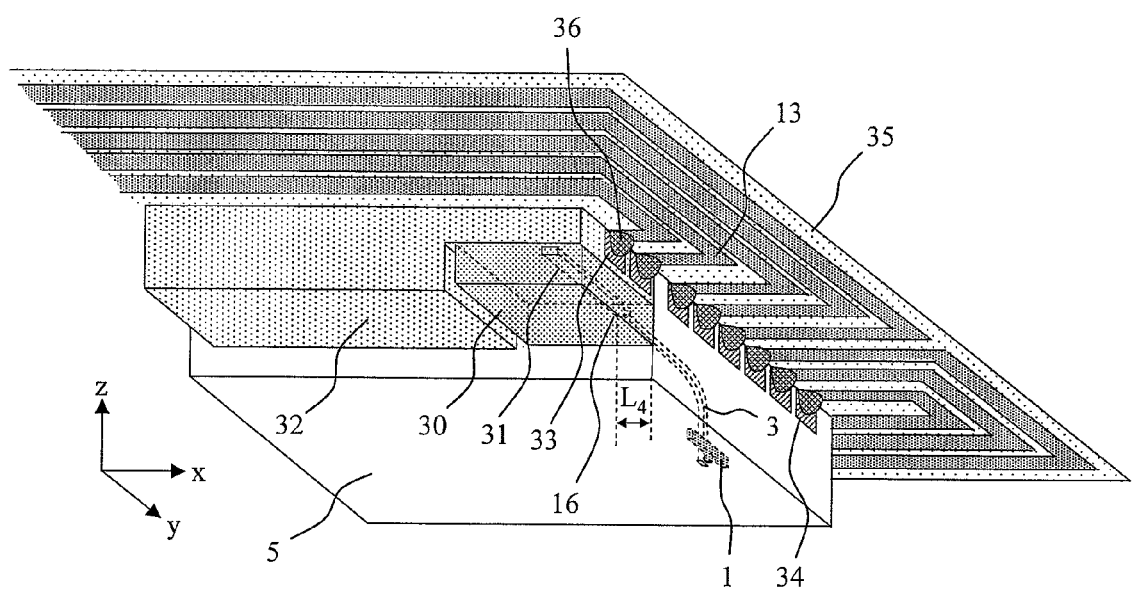
FIG. 3 is a view illustrating the head for thermal assisted magnetic recording device according to the present invention.

An edge emitting semiconductor laser 30 having a wavelength of 780 to 980 nm is used as the light source for heating with light. As illustrated in FIGS. 2A, 2B, and 3, the edge emitting semiconductor laser 30 is placed next to a side surface which is not located on an inflow end side and a trailing side, of four side surfaces of a floating slider 5. A height of the floating slider is set to 230 μm, and a width thereof in a direction parallel to a surface of a recording disk is set to 850 μm in a direction parallel to a recording track and to 700 μm in a direction perpendicular to the recording track. An edge emitting laser is used as the semiconductor laser. An entrance of the waveguide formed in the floating slider 5 is located on the side surface side of the slider on which the semiconductor laser is placed, and the emitted light from the semiconductor laser is directly coupled to the waveguide formed in the floating slider 5. The semiconductor laser 30 is placed on a sub-mount 32, and a current to be fed to the semiconductor laser is supplied via the sub-mount. In order to enhance a coupling efficiency when the emitted light from the semiconductor laser couples to the waveguide, it is preferable to set a distance between the semiconductor laser and the side surface of the slider to be as short as possible, and this distance is set to 0 to 10 μm in the present embodiment. Ideally, this distance should be 0, but there is an alignment error ranging from 0 to 10 μm.

The waveguide 3 is provided with a curved line part. Then, light travels in a direction parallel to the slider air bearing surface near a light entrance part 16, and the light travels in a direction perpendicular to the slider air bearing surface near the optical near-field generating element 1. With this configuration, the light emitted in the horizontal direction from the semiconductor laser 30 reaches the optical near-field generating element 1 from the above (from the opposite side to the air bearing surface 17). It should be noted that, when the waveguide 3 is processed, a substrate surface thereof is parallel to a y-z plane. Accordingly, the waveguide including the curved line part as described above can be easily manufactured by lithography.

The polarization direction of the emitted light from the semiconductor laser is set to be parallel to the slider air bearing surface. For this reason, a TE mode edge emitting laser is used as the semiconductor laser, and as illustrated in FIG. 2B, the laser is placed so that a bonding surface between the laser 30 and the sub-mount 32 is parallel to the air bearing surface 17 of the slider 5. When the light from this laser is transmitted through the waveguide 3 including the curved line part, a propagation direction thereof changes, and hence the polarization direction thereof becomes perpendicular to the side surface 29 of the metal structure 1 near the optical near-field generating element 1. That is, the polarization direction of the entering light coincides with a polarization direction necessary to generate surface plasmons in the metal structure 1.

The sub-mount 32 and the side surface of the slider 5 are bonded to each other by using a electrically conductive adhesive 37. The semiconductor laser 30 generates heat, and if the generated heat is not dissipated, temperature of the semiconductor laser rises, which leads to damage to the semiconductor laser or shortening of the lifetime thereof. When the sub-mount 32 and the side surface of the slider 5 are bonded to each other by using the electrically conductive adhesive 37, the heat generated by the semiconductor laser is transmitted to the sub-mount, and then is transmitted to the slider 5. The heat transmitted to the floating slider 5 is released to the recording disk side via an airflow flowing between the air bearing surface and the recording disk. As a result, it is possible to suppress the rise in temperature of the semiconductor laser.

In order to further reduce the rise in temperature of the semiconductor laser, the sub-mount 32 and a flexure 10 of the suspension may be bonded to each other by using the electrically conductive adhesive 37. This enables the heat transmitted to the sub-mount 32 to be dissipated also to the flexure 10, and hence the rise in temperature can be further reduced. At this time, a surface of the flexure on the sub-mount side may be covered by a film or multilayer film of metal having a high thermal conductivity, such as aluminum, silver, copper, and gold. With this configuration, the heat transmitted to the flexure can be dissipated further easily, and the rise in temperature of the semiconductor laser can be further reduced.

$Ta_2O_5$ is used as a material of the waveguide core 3, and $Al_2O_3$ is used as a material of the cladding 15. With regard to widths of the core, when the wavelength is 780 nm, a core width $W_1$ in the direction perpendicular to the recording track direction is set to 500 nm, and a core width $W_2$ in the direction parallel to the recording track direction is set to 300 nm. When the wavelength is 980 nm, the core width $W_1$ in the direction perpendicular to the recording track direction is set to 650 nm, and the core width $W_2$ in the direction parallel to the recording track direction is set to 350 nm. The core widths may have other values, and for example, when the wavelength is 780 nm, $W_1$=600 nm, and $W_2$=200 nm. The material of the waveguide 3 may be arbitrarily selected as long as a refractive index of the core is larger than a refractive index of the cladding. For example, it is possible to use $Al_2O_3$ as the material of the cladding and use $TiO_2$ or SiN as the material of the core. In addition, it is also possible to use $SiO_2$ as the material of the cladding and use $Ta_2O_5$, $TiO_2$, $SiO_xN_y$, or Ge-doped $SiO_2$ as the material of the core.

Figure 7:
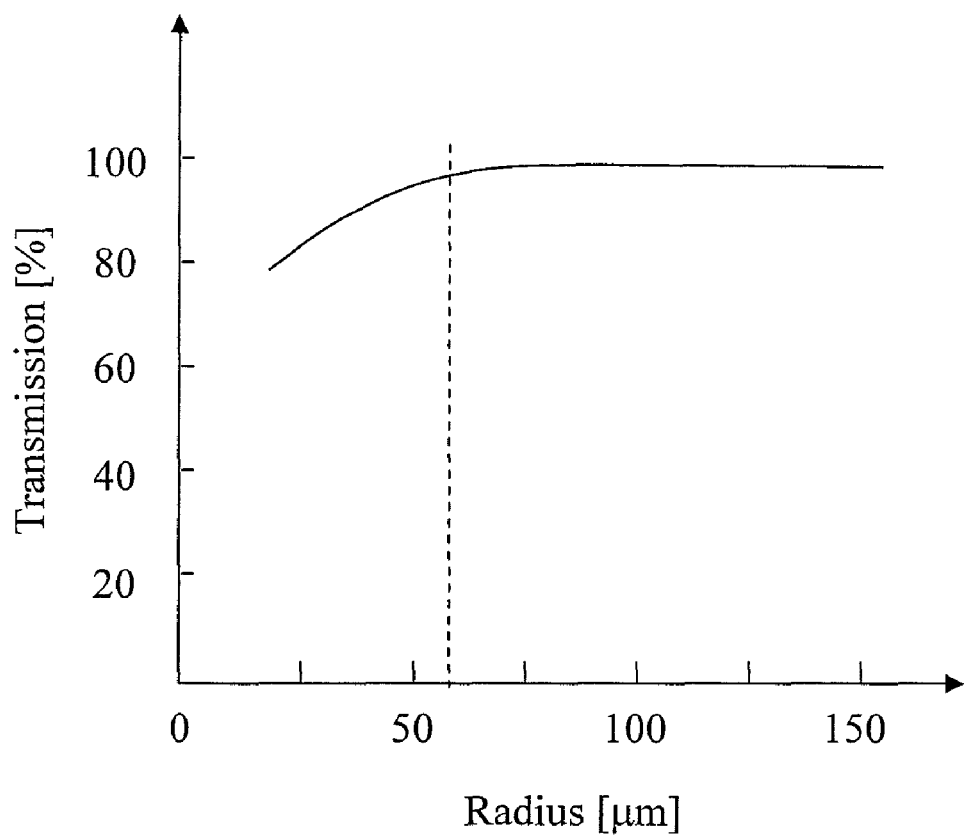
FIG. 7 is a graph showing a relation between a transmittance of light being transmitted through a waveguide and a radius of curvature.

When a radius of curvature R of the curved line part of the waveguide 3 is excessively small, light is released from the waveguide, so that propagation loss occurs. FIG. 7 shows a relation between the radius of curvature R and a transmittance of the waveguide when the core widths are 500 nm×300 nm. As shown in FIG. 7, when the radius is equal to or larger than 60 μm, the propagation loss does not occur, but when the radius is smaller than 60 μm, the propagation loss occurs, so that an intensity of the light which reaches the optical near-field generating element 1 decreases. In the present embodiment, in order to avoid the propagation loss, the radius of curvature is set to 100 μm or 150 μm. A portion of the waveguide near the optical near-field generating element 1 is configured as a straight line, and a length ($L_{10}$) of the straight line part is set to 30 μm. The length ($L_{10}$) of the straight line part may have another value as long as the coil or the magnetic pole of the magnetic head does not collide against the waveguide.

An anti-reflective coating 90 is formed on the side surface of the slider on the entrance side of the waveguide. If the light which has reached the side surface of the slider is reflected by the side surface to return to the laser, power of the laser fluctuates. The return light can be reduced by forming the anti-reflective coating 90 as described above, and the power fluctuation of the laser can be suppressed.

Figure 8:
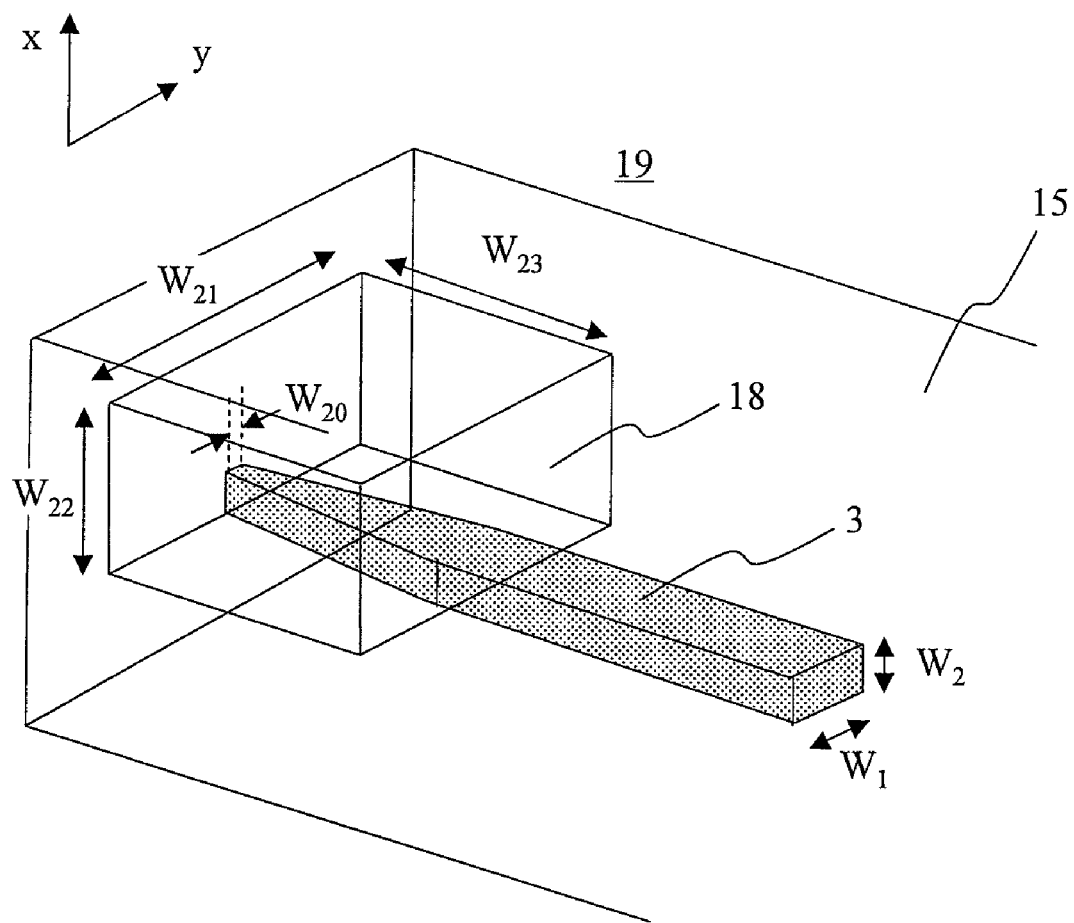
FIG. 8 is a view illustrating a spot size converter of the waveguide.

In order to efficiently couple the emitted light from the semiconductor laser to the waveguide 3, a spot size converter 19 as illustrated in FIG. 8 is formed at the entrance of the waveguide 3. A width ($W_{20}$) on the entrance side of the waveguide 3 is set to be smaller than $W_1$, and a layer 18 made of a material having an intermediate refractive index between the refractive index of the core and the refractive index of the cladding 15 is formed around the waveguide core 3 made of $Ta_2O_5$. The use of such a structure makes it possible to increase a mode field diameter in the light entrance part of the waveguide. As a result, it is possible to enhance the coupling efficiency between the emitted light from the semiconductor laser and the waveguide. In the present embodiment, $SiO_xN_y$ is used as a material of the layer 18, and a ratio of O to N in $SiO_xN_y$ is adjusted so that a refractive index of $SiO_xN_y$ is larger by 0.05 than a refractive index of $Al_2O_3$. The width $W_{20}$ on the light entrance side of the waveguide core is set to 80 nm. A width $W_{21}$, a width $W_{22}$, and a length $W_{23}$ of the layer 18 are set to 10 μm, 5 μm, and 250 μm, respectively.

In the structure according to the present invention, an orientation of the spot size converter (a direction in which light travels) is coincident with a lateral direction of the slider (y direction). Therefore, it is possible to make larger a conversion ratio of spot diameters of the spot size converter (a ratio of a mode field diameter at the entrance of the spot size converter to a mode field diameter at an exit thereof). That is, in general, as the length $W_{23}$ of the spot size converter 19 is larger, the conversion ratio of spot diameters can be made larger. In the case where the semiconductor laser is placed in the slider upper part, or in the case where the semiconductor laser is placed on the trailing side of the slider and light is coupled to the waveguide by a grating coupler, the orientation of the spot size converter is perpendicular to the air bearing surface 17 (z direction). In this case, the length $W_{23}$ of the spot size converter cannot be made larger than the height of the slider (the width in the z direction). In contrast to this, with the use of the structure according to the present invention, the orientation of the spot size converter becomes coincident with the lateral direction of the slider (y direction), and hence the length of the spot size converter can be made larger than when the spot size converter is perpendicularly placed. This is because the width of the slider in the lateral direction (the width in the y direction) is equal to or larger than twice the thickness thereof (the width in the z direction). Accordingly, it is possible to make larger the conversion ratio of spot diameters. When the conversion ratio of spot diameters can be made larger as described above, it is possible to make larger the mode field diameter at the entrance 16 of the waveguide. Therefore, it is possible to enhance the coupling efficiency between the semiconductor laser and the waveguide. In addition, a reduction amount of the coupling efficiency when the semiconductor laser is displaced becomes smaller, and hence it is possible to make larger an allowable width for a displacement amount of the semiconductor laser.

Figure 24:
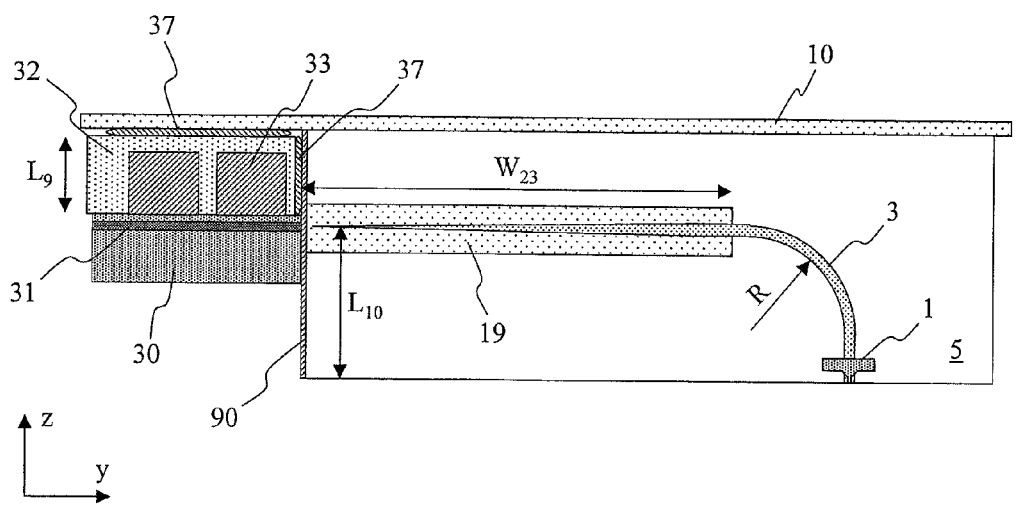
FIG. 24 is a view illustrating an example in which the optical near-field generating element and the magnetic head are brought closer to one side of the slider.

As illustrated in FIG. 24, the optical near-field generating element 1 and the magnetic head may be brought closer to the opposite side to the side surface on which the semiconductor laser 30 is placed. With this configuration, the length $W_{23}$ of the spot size converter can be made further larger, and hence it is possible to make further larger the conversion ratio of spot diameters. In the present embodiment, the optical near-field generating element and the magnetic head are brought closer to one side, whereby the length $W_{23}$ of the spot size converter is set to 500 μm.

A cavity length $L_1$, a thickness $L_2$, and a width $L_3$ of the semiconductor laser 30 are set to 300 μm, 70 μm, and 150 μm, respectively. An output intensity thereof is set to 10 to 40 mW. The cavity length $L_1$ depends on a required amount of light. If recording is possible at low power, the cavity length $L_1$ may be made smaller, and thus may be set to, for example, 200 μm. Conversely, if high power is required, it is necessary to set a large cavity length, and hence the cavity length $L_1$ may be set to, for example, 400 μm.

When an active layer 31 of the semiconductor laser is placed next to the floating slider, the active layer 31 is formed so that a position of the active layer 31 and a position of the entrance 16 of the waveguide 3 overlap with each other. In the present embodiment, a distance ($L_4$ in FIG. 3) between the entrance 16 of the waveguide and the side surface of the slider on the trailing side is set to 30 to 35 μm, and a distance ($L_4$ in FIG. 2B) between the active layer 31 of the semiconductor laser and the side surface of the semiconductor laser is set to 30 to 35 μm.

As illustrated in FIGS. 2A, 2B, and 3, a thickness of the sub-mount 32 on which the semiconductor laser 30 is mounted is made thinner at a portion, and the semiconductor laser 30 is mounted on this thinner portion. A thickness $L_9$ of the thinner portion, a thickness $L_7$ of a thicker portion, a length $L_6$, a width $L_5$, and a width $L_8$ of the thinner portion of the sub-mount are set to 100 μm, 200 μm, 850 μm, 300 μm, and 180 μm, respectively. The width $L_5$ and the width $L_8$ of the thinner portion may be adjusted according to the dimensions of the semiconductor laser. For example, in the case where the length of the semiconductor laser is 400 μm, the width $L_5$ of the sub-mount may be set to 400 μm. In addition, in order to increase the floating stability of the slider, it is preferable that the mass of the sub-mount be small. For this purpose, the length $L_6$ in the x direction and the thickness $L_7$ may be set to values smaller than the values given above. Si is used as a material of the sub-mount 32. Electrodes 33 on the sub-mount each have a multilayer structure of Ti/Pt/Au (the surface layer is gold), and are formed on an insulating layer formed on Si. The material of the sub-mount may be another material, and for example, SiC or CuW may be used.

Figure 9A:
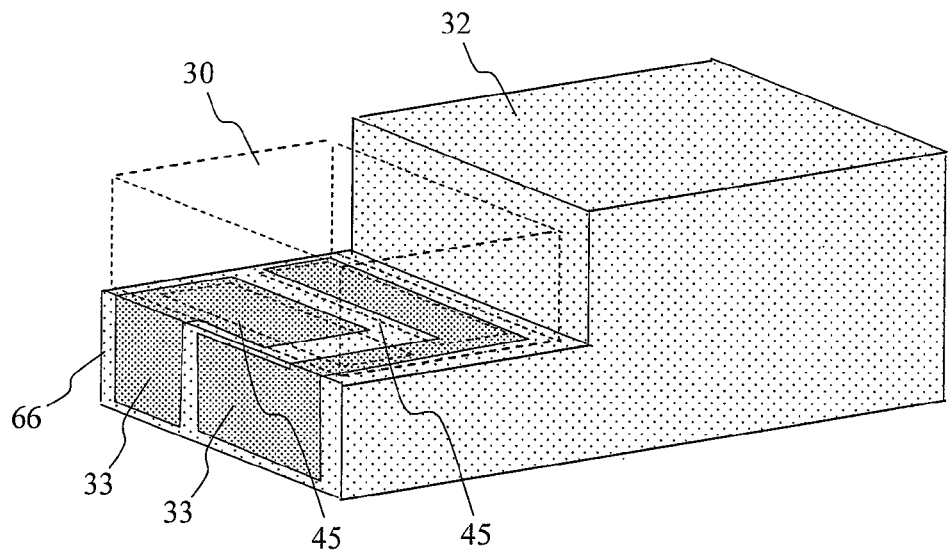
FIGS. 9A and 9B are views each illustrating a structure of a sub-mount.

As illustrated in FIG. 9A, two electrodes (a p electrode and an n electrode) 45 of the semiconductor laser 30 are formed on one surface (the surface on the sub-mount side) of the semiconductor laser 30, and are bonded to the electrodes 33 on the sub-mount 32 by solders. The electrodes 33 are exposed on a side surface 66 of the sub-mount 32, and as illustrated in FIG. 3, wiring 13 on a flexible printed circuit 35 formed on the suspension is brought into contact with the electrodes 33 on the sub-mount. The wiring 13 and the electrodes 33 on the sub-mount are bonded to each other by using solders 36. In general, as illustrated in FIG. 3, electrodes 34 for the magnetic head are placed on the side surface of the slider on the trailing side, and the electrodes 34 and the wiring 13 are bonded to each other by using solder balls. As in the structure according to the present invention, the electrodes 33 for the semiconductor laser and the electrodes 34 for the magnetic head are aligned with each other, which makes it possible to perform at the same time the bonding of the electrodes 33 for the semiconductor laser and the wiring 13 and the bonding of the electrodes 34 for the magnetic head and the wiring 13. Accordingly, the number of assembly steps can be reduced, so that the manufacturing costs can be also reduced.

Figure 9B:
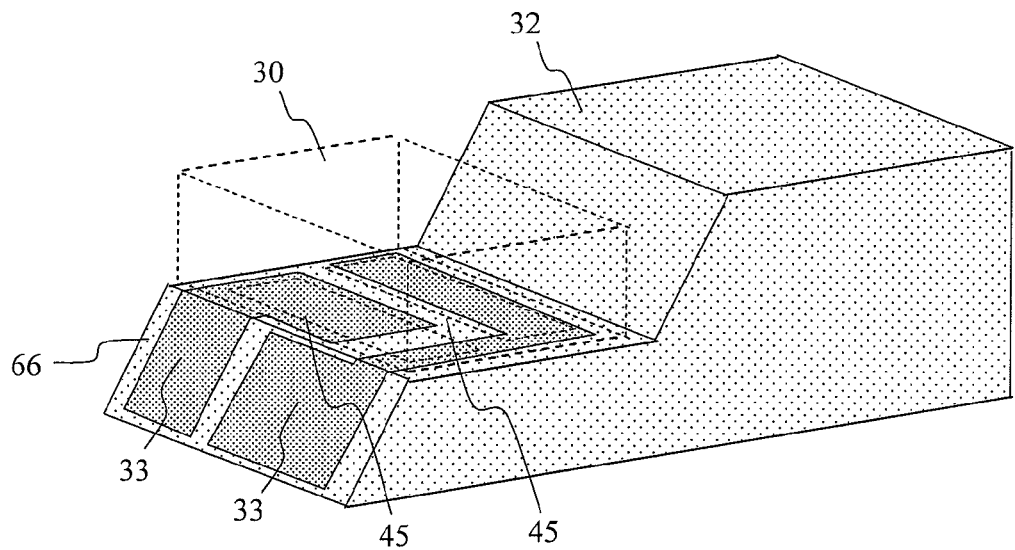

As illustrated in FIG. 9B, the side surface 66 of the sub-mount 32 may be slanted. With this configuration, at the time of forming the electrodes 33, it is possible to form at the same time a portion of the side surface 66 and a portion to be bonded to the semiconductor laser. That is, at the time of performing patterning on the portion of the side surface 66 and the portion to be bonded to the semiconductor laser, exposure and etching can be performed at the same time. In the present embodiment, Si is used as the material of the sub-mount 32, and a portion to be made thinner is formed by anisotropic etching, to thereby slant the side surface 66.

The structure according to the present invention has the following advantages.

(1) The semiconductor laser is formed on the side surface of the floating slider, and hence the total height of the head does not become higher. Accordingly, it is possible to prevent the floating thereof from becoming unstable, and it is not necessary to increase an interval between the disks in the drive, so that a thickness of the entire apparatus can be kept as small as conventional cases.

(2) When the light from the semiconductor laser is coupled to the waveguide, it is not necessary to use a grating coupler. Accordingly, the intensity of the light coupled to the waveguide is not fluctuated by fluctuations in wavelength.

(3) The heat generated by the semiconductor laser is dissipated to the floating slider and the flexure part of the suspension via the sub-mount. Then, the heat transmitted to the floating slider is released to the recording disk side via the airflow flowing between the air bearing surface and the recording disk. Accordingly, it is possible to suppress the rise in temperature of the semiconductor laser. As a result, it is possible to prevent damage to the semiconductor laser and shortening of the lifetime thereof.

(4) The orientation of the spot size converter can be made coincident with the lateral direction of the slider, and hence it is possible to make larger the length of the spot size converter. As a result, the spot conversion ratio can be increased, so that it is possible to enhance the coupling efficiency when the light from the semiconductor laser is coupled to the waveguide. Accordingly, the power of the semiconductor laser can be reduced, so that power consumption and an amount of heat generation can be decreased. In addition, the allowable width for the displacement of the semiconductor laser can be made larger, and hence it is possible to increase the yield at the time of assembly, to thereby reduce the manufacturing costs.

Hereinafter, description is given of embodiments in which the structure of the sub-mount, the method of placing the semiconductor laser, and the shape of the waveguide are changed.

Figure 10:
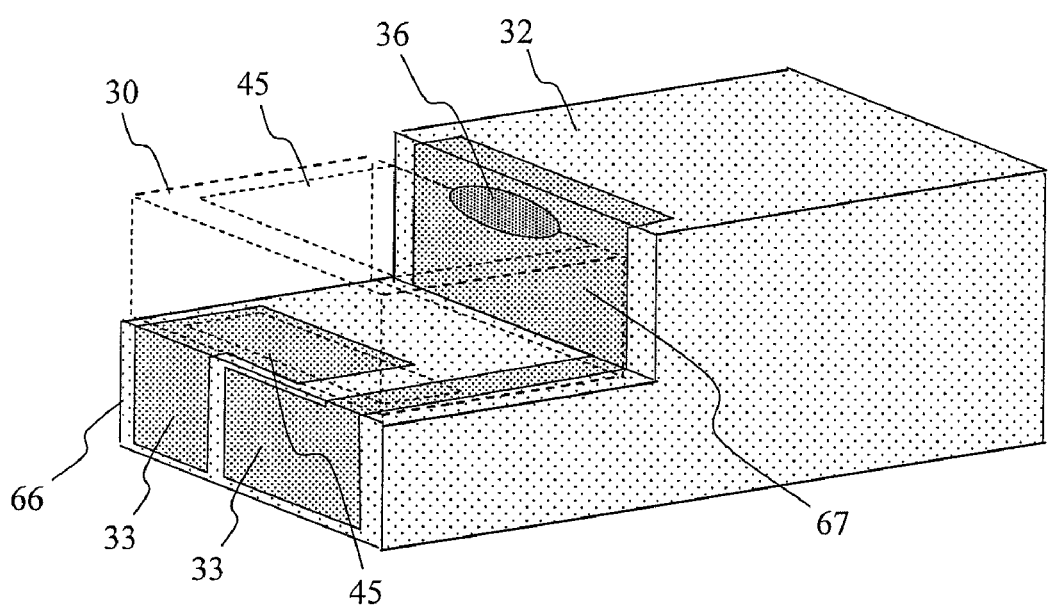
FIG. 10 is a view illustrating the structure of the sub-mount, and illustrating an example in which electrodes of the semiconductor laser are formed on both surfaces.

In the above-mentioned embodiment, both of the p electrode and the n electrode of the semiconductor laser are formed on the surface in contact with the sub-mount. Alternatively, one of the two electrodes may be formed on the opposite side to the surface in contact with the sub-mount. In an embodiment illustrated in FIG. 10, the n electrode of the semiconductor laser is formed on the opposite side to the sub-mount 32, and an electrode 67 connected to the n electrode is formed on a side surface of a step part of the sub-mount 32. The n electrode and the electrode 67 are bonded to each other by using the solder 36 or a conductive adhesive agent.

Figure 11A:
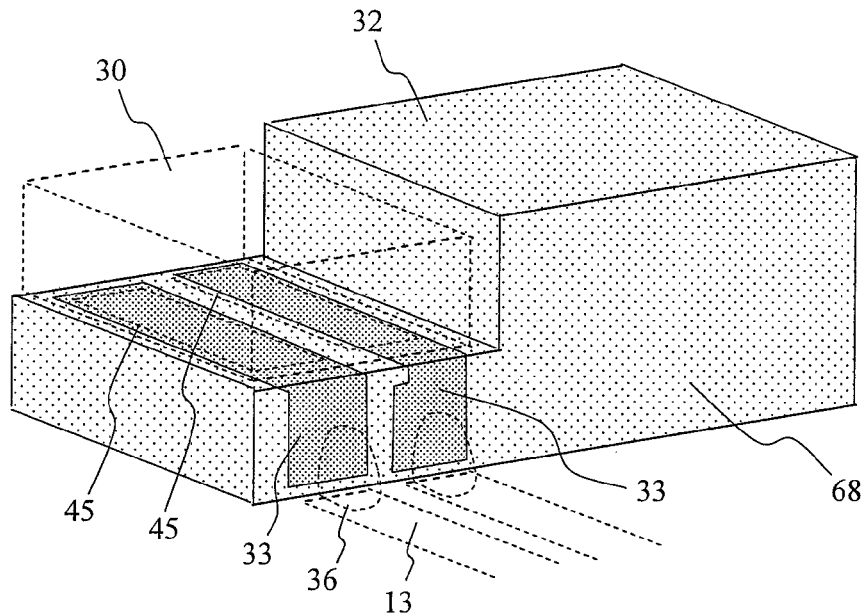
FIGS. 11A and 11B are views each illustrating the structure of the sub-mount.
Figure 11B:
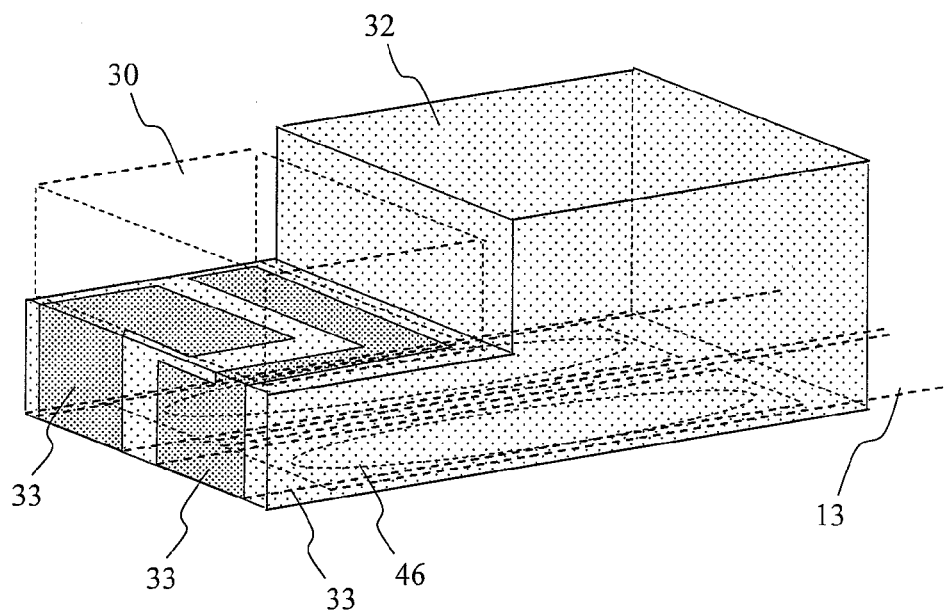

In the above-mentioned embodiment, the electrodes 33 on the sub-mount 32 and the wiring 13 on the suspension are bonded to each other on the side surface of the sub-mount 32 on the trailing side. Alternatively, as illustrated in FIG. 11A, the electrodes 33 and the wiring 13 may be bonded to each other on a side surface 68 of the sub-mount on the opposite side to a light emitting end of the semiconductor laser 30. Still alternatively, as illustrated in FIG. 11B, the electrodes 33 for the semiconductor laser may be formed so as to extend onto an opposite surface of the sub-mount 32 (the surface opposite to the surface on which the semiconductor laser is placed), and the wiring 13 on the suspension may be placed so as to come into contact with the opposite surface of the sub-mount 32. In the present embodiment, the flexible printed circuit 35 on which the wiring 13 is formed is placed between the sub-mount 32 and the flexure 10, and the electrodes 33 on the sub-mount and the wiring 13 are bonded to each other by using a electrically conductive adhesive or solders 46. In order to dissipate as much as possible the heat generated by the semiconductor laser 30 to the outside of the sub-mount, a contact area between the electrodes 33 on the sub-mount 32 and the wiring 13 is made as large as possible, to thereby allow the heat to be dissipated to the wiring 13 made of metal. It should be noted that the wiring 13 between the sub-mount 32 and the flexure 10 may be connected to a ground, and this wiring may be electrically connected to the flexure 10. This makes it possible to dissipate the heat generated by the semiconductor laser to the flexure, and hence the rise in temperature of the semiconductor laser can be reduced.

Figure 12:
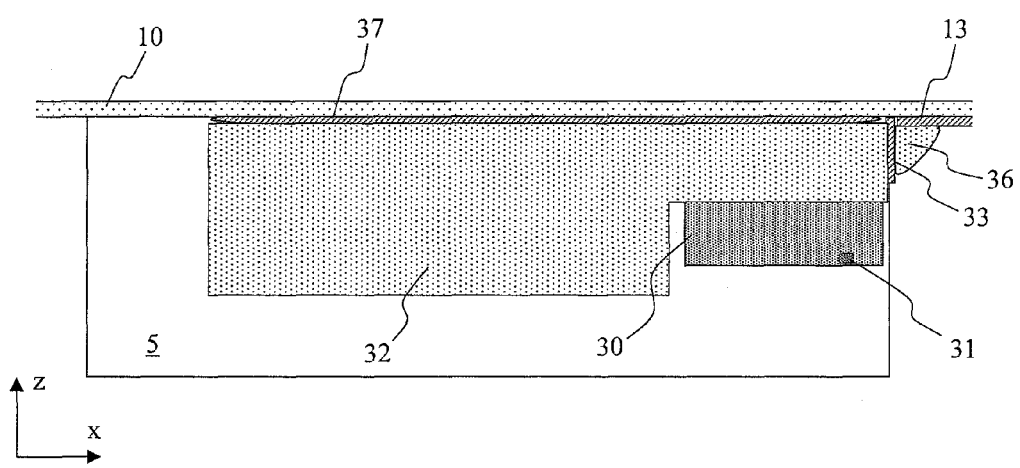
FIG. 12 is a view illustrating an example in which an active layer of the semiconductor laser is formed on an opposite side to a surface in contact with the sub-mount.

In the above-mentioned embodiment, the active layer 31 of the semiconductor laser 30 is formed near the surface in contact with the sub-mount 32. Alternatively, as illustrated in FIG. 12, the active layer 31 may be formed near a surface opposite to the surface in contact with the sub-mount 32.

Figure 13A:
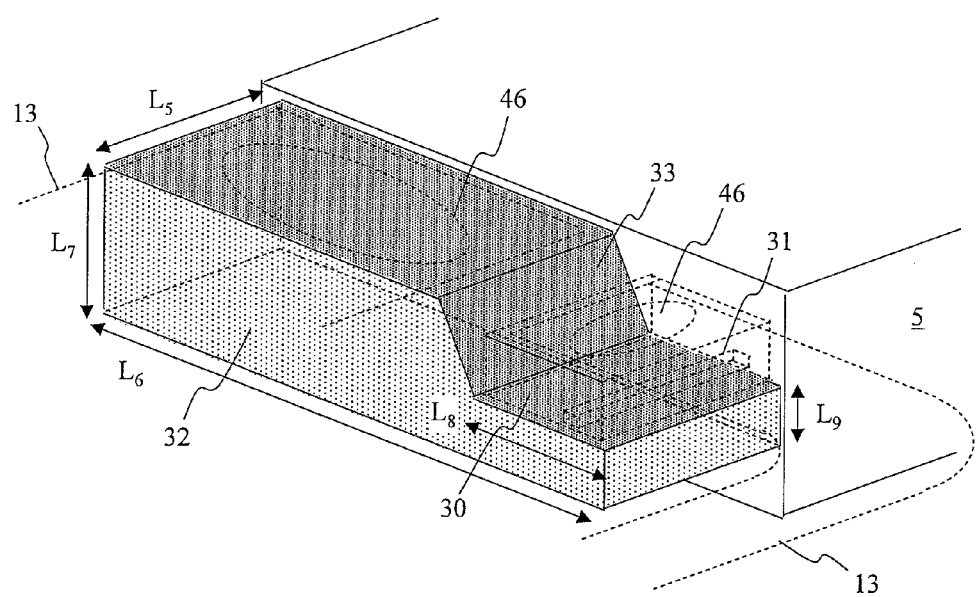
FIGS. 13A and 13B are views each illustrating a structural example of the sub-mount in which the semiconductor laser is placed on a suspension side of the sub-mount.
Figure 13B:
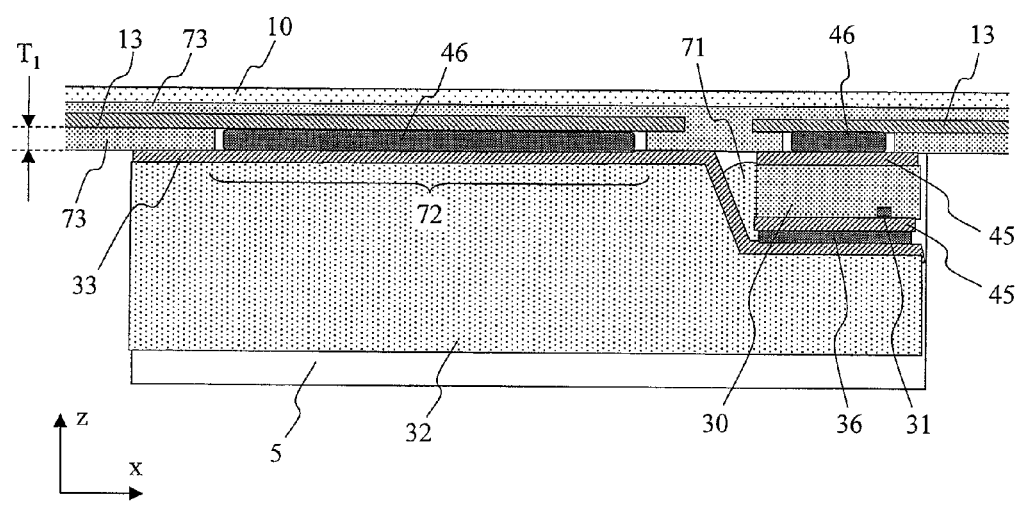

In the above-mentioned embodiment, the semiconductor laser is placed on the lower surface of the sub-mount (on the surface opposite to the suspension). Alternatively, the semiconductor laser may be placed on the upper side of the sub-mount. FIG. 13A is a perspective view illustrating an embodiment in which the semiconductor laser 30 is placed on the upper side of the sub-mount 32, and FIG. 13B is a side view thereof. A TE mode edge emitting laser is used as the semiconductor laser 30, and the cavity length $L_1$, the thickness $L_2$, and the width $L_3$ are set to 350 μm, 70 μm, and 150 μm, respectively. The two electrodes of the semiconductor laser are formed on the surface on the sub-mount side and on the surface opposite thereto, respectively. The thickness $L_7$ of the sub-mount 32 is set to 200 μm, and the thickness $L_9$ at the portion on which the semiconductor laser is mounted is set to 130 μm. The width $L_5$, the length $L_6$, and the width $L_8$ of the thinner portion are set to 360 μm, 850 μm, and 170 μm, respectively. Si or SiC is used as the material of the sub-mount. The electrode 33 for the semiconductor laser is formed on the entire surface of the sub-mount 32 in contact with the semiconductor laser 30. The electrode 33 on the sub-mount has a multilayer structure of Ti/Pt/Au (the surface layer is gold). The electrode 33 on the sub-mount and one of the two electrodes 45 of the semiconductor laser 30 are bonded to each other by using the solder 36. The electrode 33 on the sub-mount is bonded to the wiring 13 which is placed thereon and made of copper, by using the solder or the electrically conductive adhesive 46. Another of the two electrodes 45 of the semiconductor laser 30, which is formed on the surface opposite to the surface in contact with the sub-mount 32, is bonded to another wiring 13 placed thereon by using the solder or the electrically conductive adhesive 46. It should be noted that, when the wiring 13 is attached, the electrically conductive adhesive may overflow to come into contact with the electrode on the opposite side, to thereby short-circuit the two electrodes of the semiconductor laser. In order to prevent this short-circuiting, a gap between the side surface of the semiconductor laser and the electrode 33 may be filled with an insulating material 71 such as a photo-curable resin.

Figure 14A:
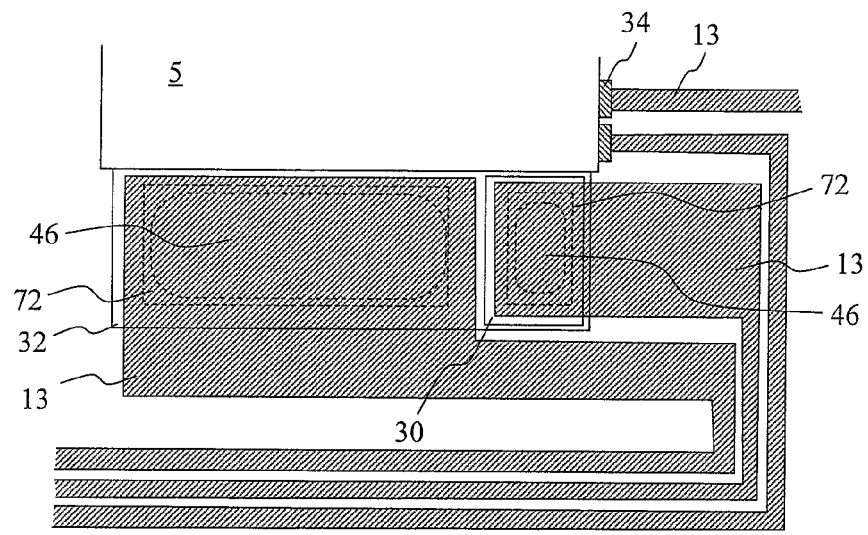
FIGS. 14A and 14B are views each illustrating a shape of wiring.

In the case where the semiconductor laser is placed on the upper side of the sub-mount as described above, it is preferable that a contact area between the electrode 33 on the sub-mount and the wiring 13 and a contact area between the another electrode 45 of the semiconductor laser and the wiring 13 be made as large as possible. With this configuration, the heat generated by the semiconductor laser is dissipated to the wiring, and hence it is possible to reduce the rise in temperature of the semiconductor laser. In the present embodiment, the shape of the wiring 13 is laid out as illustrated in FIG. 14A, and substantially entire surfaces of the electrode 33 on the sub-mount 32 and the another electrode 45 of the semiconductor laser are brought into contact with the wiring 13.

In order to prevent leakage of electricity and corrosion, the surface of the wiring 13 other than the portions in contact with the electrode 33 on the sub-mount and the another electrode 45 of the semiconductor laser is covered by polyimide (73 in FIG. 13B). At this time, ends of a portion 72 at which the wiring 13 is exposed are located on the inner side with respect to ends of the electrode 33 on the sub-mount or the another electrode 45 of the semiconductor laser. With this configuration, a side wall of polyimide at a boundary between the portion 72 at which the wiring 13 is exposed and the portion at which the wiring 13 is not exposed serves to block the solder or the electrically conductive adhesive 46 from overflowing to the outside of the electrode 33 or the another electrode 45 of the semiconductor laser. In the present embodiment, a thickness $T_1$ of polyimide on the surface is set to 5 μm, and a periphery of the bonded region is surrounded by a wall of polyimide having a height of 5 μm, to thereby prevent the solder or the electrically conductive adhesive 46 from overflowing from the electrodes.

In the embodiment in which the semiconductor laser is placed on the upper side of the sub-mount, the electrode 33 on the sub-mount or the another electrode 45 of the semiconductor laser may be used as a ground, and the wiring 13 may be brought into contact with the flexure 10 of the suspension. The flexure 10 is made of metal (normally, stainless steel), and hence the heat transmitted to the wiring 13 can be dissipated to the flexure by bringing the wiring 13 into contact with the flexure. Accordingly, it is possible to reduce the rise in temperature of the semiconductor laser. For example, in the present embodiment, the wiring connected to the another electrode 45 of the semiconductor laser 30 is brought into contact with the flexure. Here, the surface of the flexure in contact with the wiring 13 may be covered by a metal material having a high thermal conductivity, such as copper and gold. With this configuration, the heat transmitted to the flexure is dissipated more easily, so that the rise in temperature of the semiconductor laser can be further reduced.

Figure 14B:
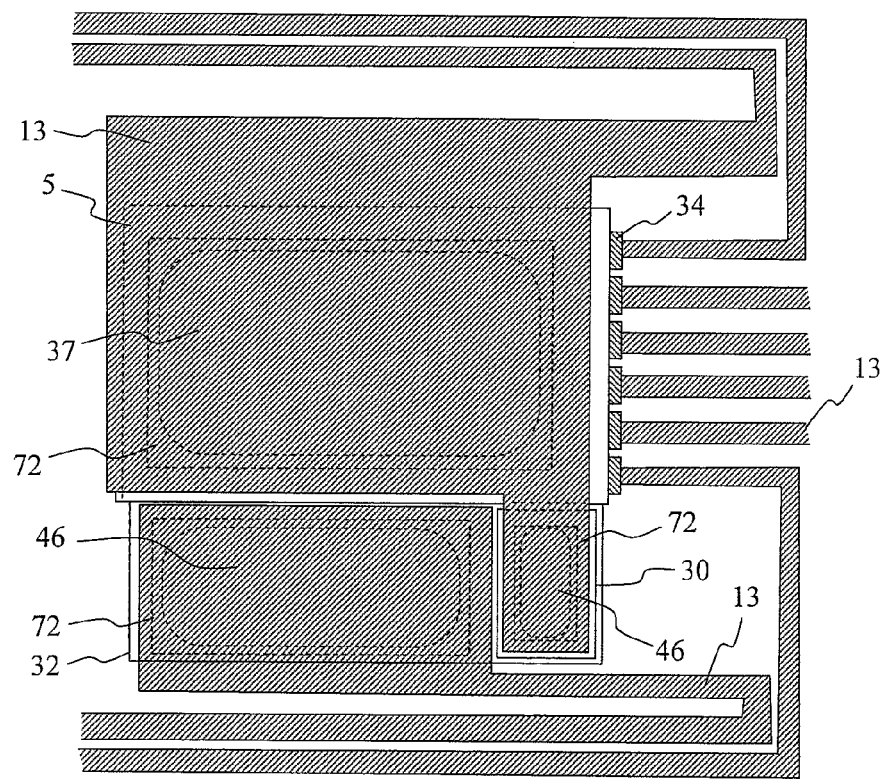

As illustrated in FIG. 14B, the wiring for the semiconductor laser may be placed so as to run over the slider 5. In the present embodiment, the wiring 13 connected to the another electrode 45 of the semiconductor laser 30 is placed so as to pass over the slider 5. At this time, the wiring 13 passing over the slider is formed so as to cover the entire upper surface of the slider 5. With this configuration, an area of the wiring 13 becomes larger, so that the heat transmitted to the wiring 13 is dissipated more easily. That is, the wiring 13 functions as a heat sink. As a result, the rise in temperature of the semiconductor laser can be suppressed.

In the case where the wiring for the semiconductor laser is caused to pass over the slider 5 as described above, the wiring 13 and the slider 5 may be insulated from each other, or may be electrically connected to each other. In the embodiment of FIG. 14B, the another electrode 45 (the electrode on the suspension side) of the semiconductor laser is used as the ground, and the wiring 13 connected thereto is electrically connected to the slider 5. The wiring 13 having the surface covered by polyimide is fixed to the surface of the flexure. The wiring is exposed on the upper surface of the slider 5, and the electrically conductive adhesive 37 is applied thereto, whereby the slider 5 is fixed onto the wiring 13. At this time, ends of the portion 72 at which the wiring is exposed are located on the inner side with respect to ends of the slider 5. With this configuration, the side wall of polyimide at the boundary between the portion at which the wiring is exposed and the portion at which the wiring is not exposed serves to block the electrically conductive adhesive 37 from overflowing to the outside of the slider (serves as a so-called stud formed on a conventional suspension). When the wiring 13 and the slider 5 are electrically connected to each other as described above, the heat transmitted to the wiring 13 is dissipated to the slider 5, and hence it is possible to reduce the rise in temperature of the semiconductor laser. At this time, the wiring 13 passing over the slider may be brought into contact also with the flexure 10 of the suspension. This allows the heat to be dissipated to both of the slider and the flexure, and hence the rise in temperature of the semiconductor laser can be further reduced. It should be noted that, in the above-mentioned embodiment, the wiring connected to the another electrode 45 of the semiconductor laser 30 is caused to pass over the slider 5, but the wiring connected to the electrode 33 on the sub-mount may be caused to pass over the slider 5.

Figure 15:
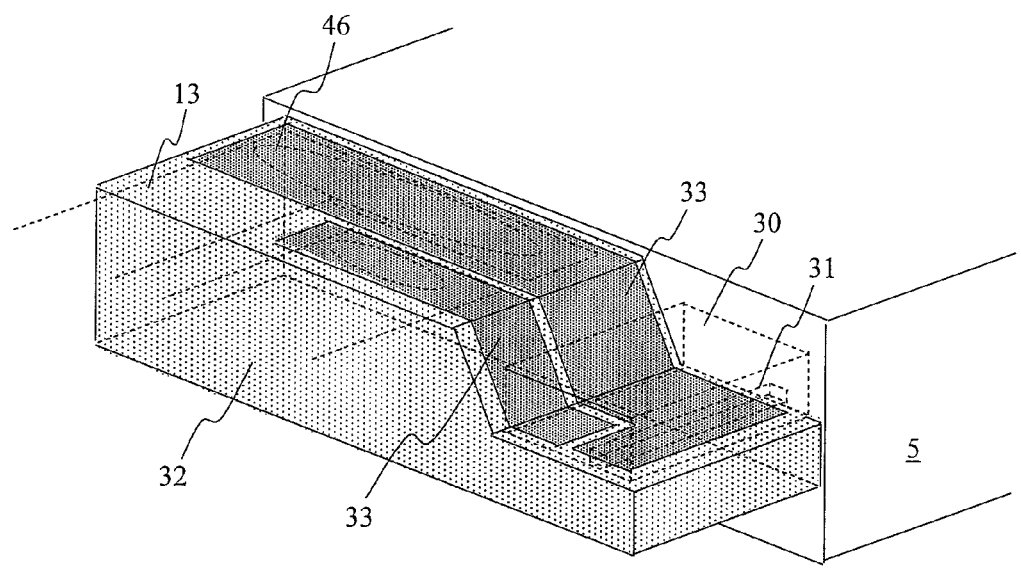
FIG. 15 is a view illustrating an example in which two electrodes for the semiconductor laser are formed on the sub-mount.

In the above-mentioned embodiment in which the semiconductor laser is placed on the upper side of the sub-mount, the another of the two electrodes of the semiconductor laser is directly connected to the wiring on the suspension. Alternatively, as illustrated in FIG. 15, the two electrodes 33 may be formed on the sub-mount 32, and both of the two electrodes of the semiconductor laser 30 may be connected to the electrodes 33 on the sub-mount. In the present embodiment, the two electrodes of the semiconductor laser are formed on the surface of the semiconductor laser in contact with the sub-mount, and are bonded to the electrodes 33 on the sub-mount by solders. The electrodes 33 on the sub-mount are bonded to the wiring 13 by using the solder or the electrically conductive adhesive 46.

Figure 16:
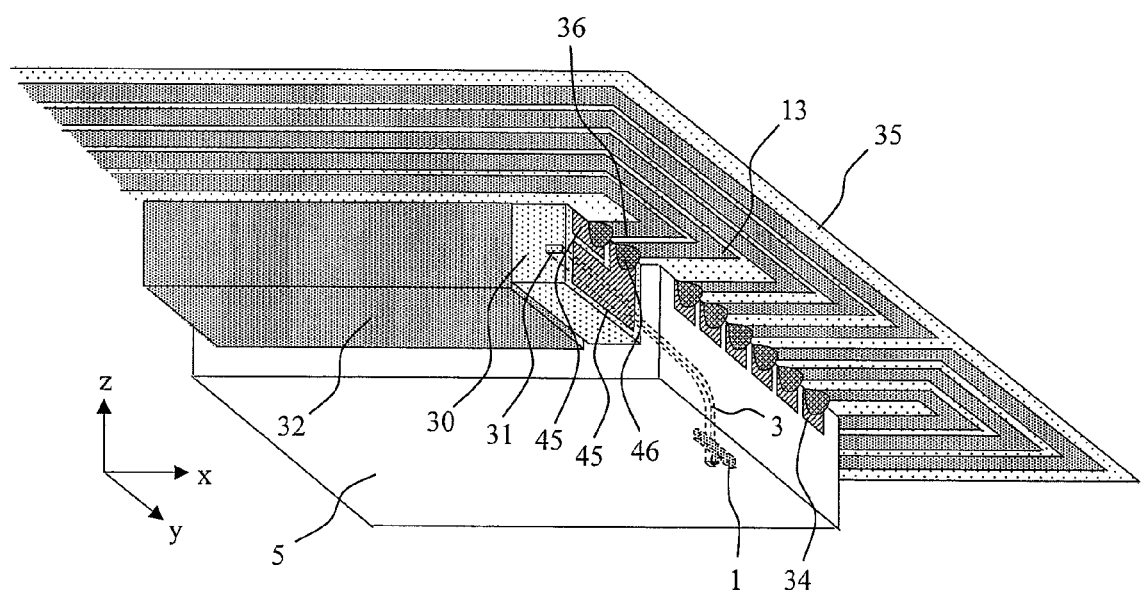
FIG. 16 is a view illustrating an example in which the orientation of a surface of the semiconductor laser in contact with the sub-mount is perpendicular to a slider air bearing surface.

In the above-mentioned embodiment, the semiconductor laser is placed so that the surface of the semiconductor laser in contact with the sub-mount is parallel to the slider air bearing surface 17. Alternatively, as illustrated in FIG. 16, the semiconductor laser 30 may be placed so that the surface of the semiconductor laser 30 in contact with the sub-mount 32 is perpendicular to the slider air bearing surface 17. In the present embodiment, the active layer 31 of the semiconductor laser 30 is formed on the trailing side, and the two electrodes (the p electrode and the n electrode) 45 are formed so as to be exposed on the side surface of the semiconductor laser on the trailing side. The two electrodes 45 are directly connected to the wiring 13 by using the solder or the electrically conductive adhesive 46. When the semiconductor laser is placed as described above, it is not necessary to make a part of the sub-mount thinner, which makes it possible to suppress the manufacturing cost of the sub-mount. In the placement as described above, in the case where the semiconductor laser is a TE mode laser (a laser in which the polarization direction of emitted light is horizontal to the surface in contact with the sub-mount), the polarization direction of the light entering the optical near-field generating element 1 is coincident with the direction perpendicular to the recording track (y direction). Accordingly, it is not possible to use the optical near-field generating element as illustrated in FIG. 4 in which the polarization direction of light needs to be made coincident with the recording track direction (x direction). Therefore, a semiconductor laser (TM mode laser) in which the polarization direction of emitted light is coincident with the direction perpendicular to the surface in contact with the sub-mount is used as the semiconductor laser.

Figure 17:
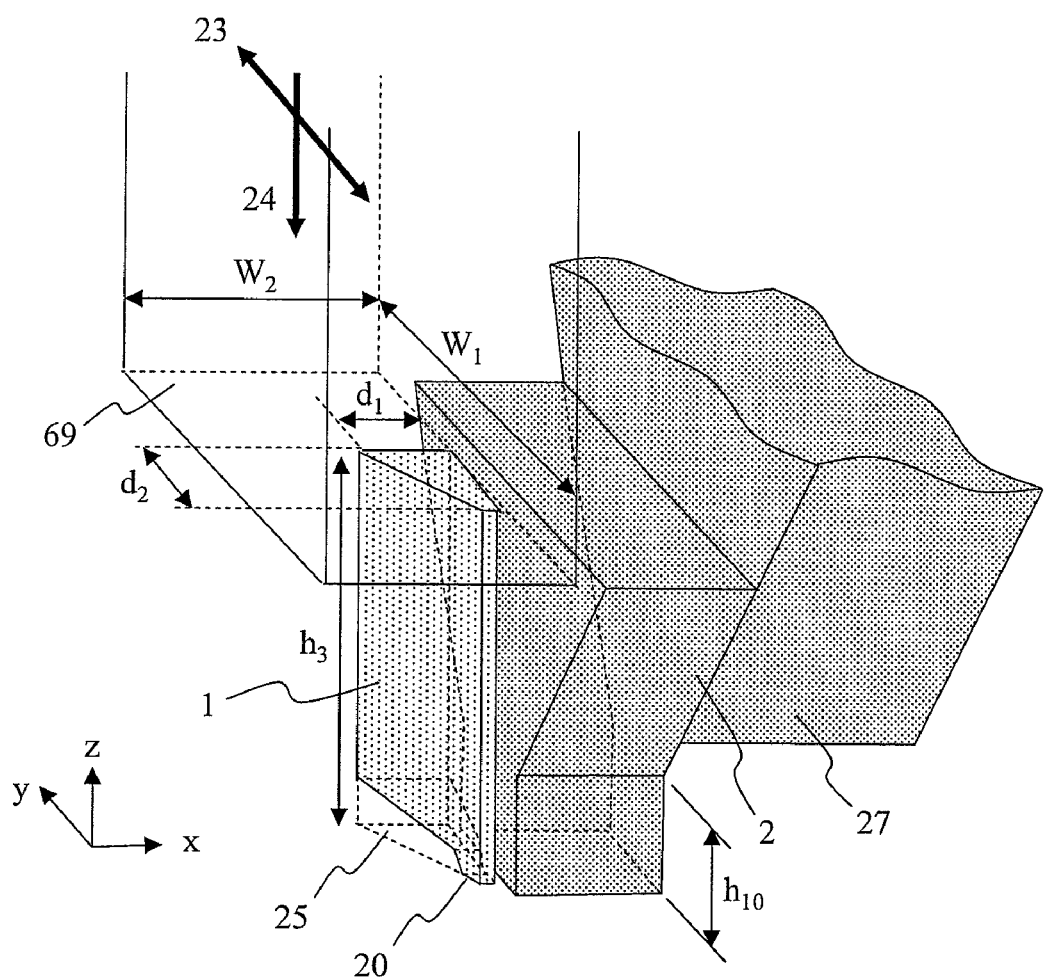
FIG. 17 is a view illustrating an optical near-field generating element in which a polarization direction of entering light is coincident with a direction perpendicular to a recording track direction.

In the case as illustrated in FIG. 16 where the semiconductor laser is placed so that the surface of the semiconductor laser in contact with the sub-mount is perpendicular to the slider air bearing surface, a TE mode laser may be used as the semiconductor laser, and an element which is capable of functioning even when the polarization direction of light entering the optical near-field generating element is coincident with the direction perpendicular to the recording track may be used as the optical near-field generating element. FIG. 17 illustrates an example of such an optical near-field generating element. In the present embodiment, the metal structure 1 having a shape in which a width $d_1$ in the direction parallel to the recording track becomes gradually smaller toward the direction perpendicular to the recording track (y direction) is used. When light whose polarization direction is in the y direction (the direction indicated by the arrow 23) is caused to enter this element, electric charges inside of the metal oscillate in the y direction, and concentrate on the vertex 20. As a result, an optical near-field is generated in the vicinity of the vertex 20. In particular, if the dimensions of the metal structure are optimized so that plasmons are generated in the metal structure, an extremely strong optical near-field is generated in the vicinity of the vertex 20.

Figure 18A:
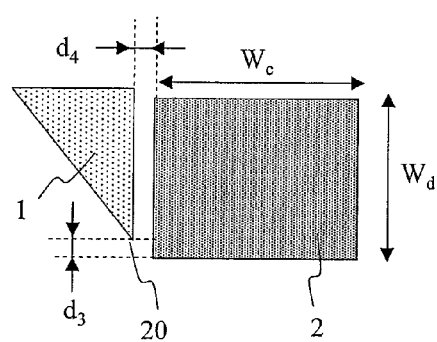
FIGS. 18A to 18F are views each illustrating the optical near-field generating element in which the polarization direction of the entering light is coincident with the direction perpendicular to the recording track direction, the optical near-field generating element being observed from the air bearing surface side.
Figure 18B:
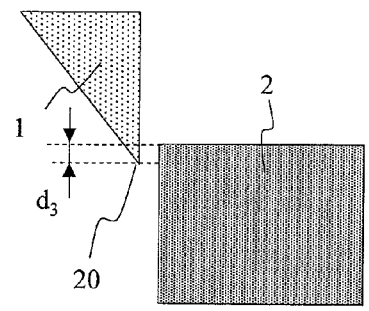

In the present embodiment, the wavelength of the entering light is set to 780 nm, and gold is used as the material of the metal structure 1. A shape of the metal structure 1 when being observed from the air bearing surface side is a right triangle as illustrated in FIG. 18A, and the vertex angle $\theta_1$, the height $h_3$, and the width $d_2$ in the y direction are set to 30°, 500 nm, and 80 nm, respectively. Similarly to the optical near-field generating element illustrated in FIG. 4, the recess 25 is formed in a part of the air bearing surface. The material of the metal structure 1 may be arbitrarily selected as long as the material has conductivity, and hence silver, copper, aluminum, or an alloy may be used. The width $W_c$ in the recording track direction and the width $W_d$ in the direction perpendicular to the recording track, of the main pole 2 are set to 170 nm and 150 nm, respectively. As illustrated in FIG. 18A or 18B, the vertex 20 at which the optical near-field is generated is located in the vicinity of an edge of the main pole 2. The magnetic field strength becomes highest in the edge part of the main pole 2. Accordingly, when the vertex 20 of the metal structure 1 is placed in the vicinity of the edge of the main pole 2 as illustrated in FIG. 18A or 18B, a strong magnetic field can be applied by a heated portion. In the present embodiment, a distance $d_3$ in the y direction between the end of the main pole 2 and the leading end part 20 of the metal structure 1 is set to 30 nm, and a distance $d_4$ in the x direction is set to 20 nm. The metal structure 1 is placed below a terminal end part 69 of the waveguide core 3. For the widths of the waveguide core 3, the width $W_1$ in the y direction is set to 500 nm, and the width $W_2$ in the x direction is set to 300 nm. The widths of the core 3 may have other values, and for example, the width $W_1$ in the y direction and the width $W_2$ in the x direction may be set to 300 nm and 500 nm, respectively.

Figure 18C:
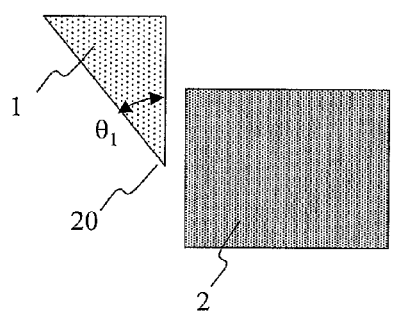

In the case where the vertex 20 of the metal structure 1 at which the optical near-field is generated is placed in the vicinity of the edge of the main pole 2 as described above, the magnetic field strength at the heated position is varied by the displacement between the metal structure 1 and the main pole 2. In order to prevent this, as illustrated in FIG. 18C, the vertex 20 of the metal structure 1 may be located at the center of the main pole 2. The variation in magnetic field strength near the center of the magnetic pole is small. That is, assuming that the magnetic field strength is H, dH/dy is small. Accordingly, the vertex 20 is placed near the center of the main pole 2, whereby an influence of the displacement between the metal structure 1 and the main pole 2 can be reduced.

Figure 18D:
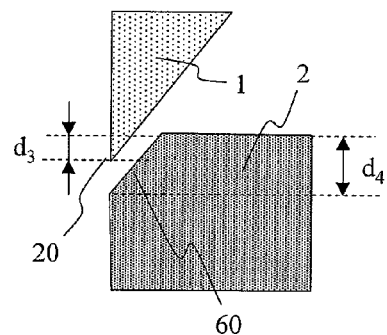
Figure 18E:
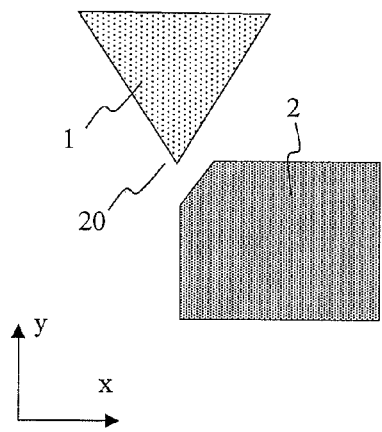

As illustrated in FIG. 18D, near the vertex 20 of the metal structure 1 at which the optical near-field is generated, a cut-out 60 may be formed at a corner of the main pole. With this configuration, the vertex 20 of the metal structure 1 at which the optical near-field is generated can be brought closer to the main pole, and hence it is possible to increase the magnetic field strength generated at the vertex 20. In the present embodiment, the distance $d_3$ in the y direction between the end of the main pole 2 and the leading end part 20 is set to 30 nm, and the width $d_4$ of the cut-out 60 of the main pole is set to 50 nm. In the case where the cut-out is formed at the corner of the main pole as described above, the shape of the metal structure 1 when being observed from the air bearing surface side may be an isosceles triangle as illustrated in FIG. 18E. With this configuration, a cross sectional area of the metal structure 1 increases, and an amount of electric charges concentrating on the vertex 20 accordingly increases, so that a stronger optical near-field can be generated.

Figure 18F:
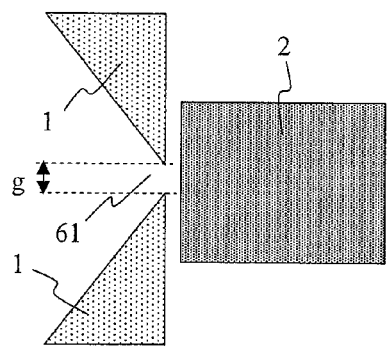

As illustrated in FIG. 18F, two metal structures 1 may be placed so that the vertexes 20 at which the optical near-field is generated are opposed to each other. Electric charges concentrating on the respective vertexes interact with each other so as to attract each other, with the result that a strong optical near-field can be generated in a gap 61 between the two vertexes. In the present embodiment, an interval g between the two vertexes is set to 10 nm.

Figure 19A:
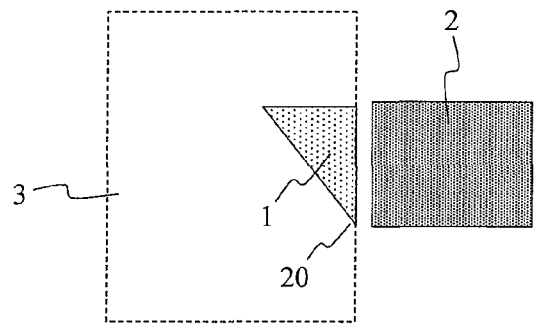
FIGS. 19A to 19C are views each illustrating a positional relation between: the optical near-field generating element in which the polarization direction of the entering light is coincident with the direction perpendicular to the recording track direction; and the waveguide.
Figure 19B:
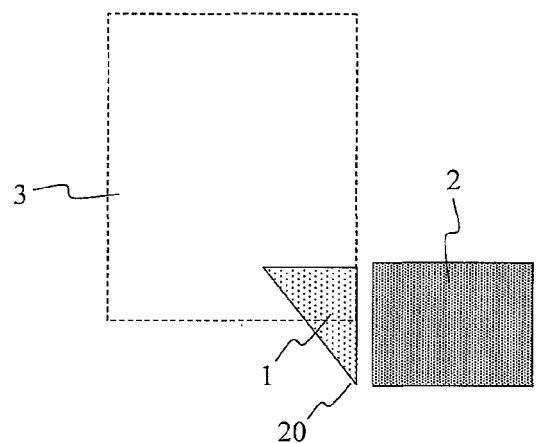
Figure 19C:
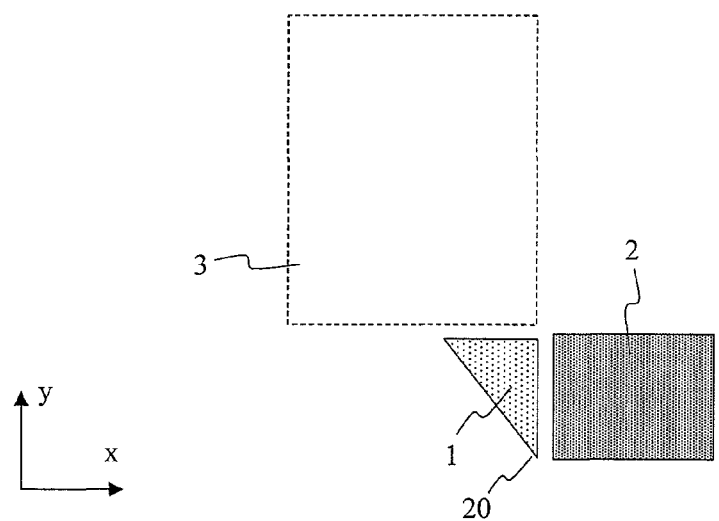

The metal structure 1 may be placed in the central part of the waveguide core 3 as illustrated in FIG. 19A, or may be placed at an end of the waveguide core 3 as illustrated in FIG. 19B. In the case as illustrated in FIG. 19B where the metal structure 1 is placed at the end of the waveguide core 3, the evanescent light generated at the interface between the core 3 and the cladding 15 enters the metal structure 1, whereby plasmons are generated in the metal structure 1. In addition, as illustrated in FIG. 19C, the waveguide core 3 may be placed next to the metal structure 1. In this case, similarly to the embodiment of FIG. 6, the waveguide core 3 is placed so that the terminal end part 69 of the core reaches the slider air bearing surface. In the case where the core is placed as described above, the evanescent light generated at the interface between the core 3 and the cladding 15 excites surface plasmons on the side surface of the metal structure 1, the excited surface plasmons are transmitted to the bottom part of the metal structure 1, and localized plasmons are excited in the bottom part. A strong optical near-field is generated by the localized plasmons in the vicinity of the vertex 20.

Figure 20A:
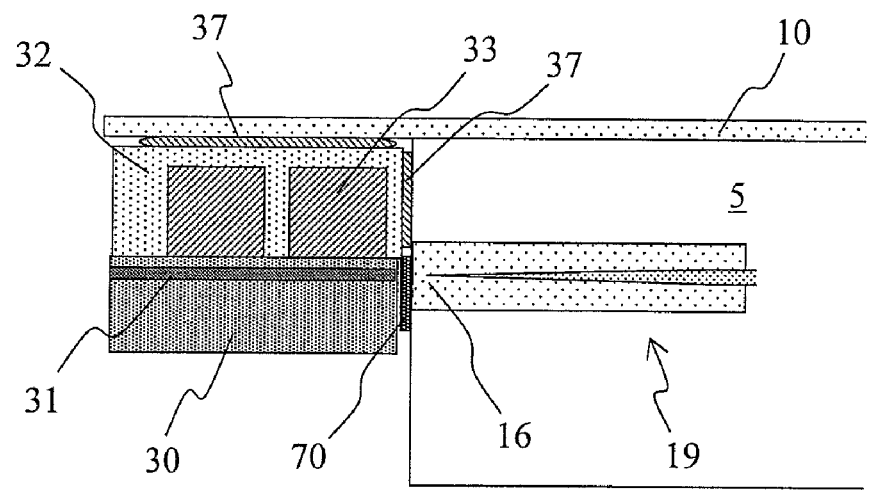
FIGS. 20A and 20B are views each illustrating a method of reducing reflected light on the side surface of the slider.

In the above-mentioned embodiment, the light from the semiconductor laser is caused to perpendicularly enter the side surface of the floating slider at the entrance 16 of the waveguide. At this time, in order to prevent the reflected light generated on the side surface of the floating slider from returning to the semiconductor laser to cause return light noise, the anti-reflective coating 90 is formed on the side surface of the slider. However, in a slider manufacturing process, a step of forming the anti-reflective coating is added, and hence the manufacturing cost of the slider increases. In order to remove an influence of the return light generated on the side surface of the slider without forming the anti-reflective coating, as illustrated in FIG. 20A, a light transmissive resin 70 having a refractive index larger than 1 may be formed between the semiconductor laser 30 and the slider 5 instead of the anti-reflective coating. When the resin 70 having the refractive index larger than 1 is formed as described above, a difference in refractive index on the side surface of the slider becomes smaller, and hence a reflectance on the side surface of the slider can be reduced. In addition, when the light emitting end surface of the semiconductor laser is covered as described above, degradation of the end surface can be prevented. That is, it is possible to prevent a change in properties of the end surface and attachment of contaminations which are caused when the end surface comes into contact with air. In the present embodiment, a photo-curable resin is used as the resin 70, and a refractive index thereof is made equal to a refractive index of a core 18 for spot diameter conversion constituting the spot size converter 19. In the case where an amount of reflected light generated at the interface between the cladding 15 and air is larger than an amount of reflected light generated at the interface between the core 18 for spot diameter conversion and air, the refractive index of the resin 70 may be made equal to the refractive index of the cladding 15.

Figure 20B:
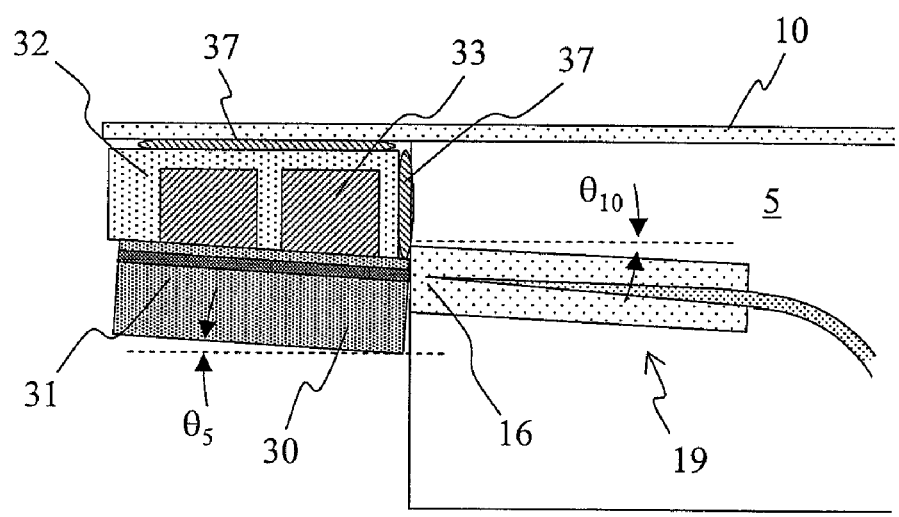

In order to reduce the amount of the reflected light on the side surface of the slider, as illustrated in FIG. 20B, the semiconductor laser 30 may be obliquely placed, to thereby cause the emitted light from the semiconductor laser 30 to obliquely enter the side surface of the slider. With this configuration, the reflected light which returns to the semiconductor laser 30 can be reduced, so that the return light noise can be reduced. At this time, in order to efficiently couple the light from the semiconductor laser 30 to the waveguide, it is advisable to slant the direction of the waveguide core near the entrance 16 of the waveguide with respect to the side surface of the slider so that a traveling direction of the light inside of the waveguide and a traveling direction of the emitted light from the semiconductor laser 30 are parallel to each other. In order to sufficiently reduce the return light, it is preferable that an angle $\theta_5$ formed by the direction of the emitted light from the semiconductor laser 30 and a normal line to the side surface of the slider be larger than ½ a beam divergence angle (full width at half maximum) of the emitted light from the semiconductor laser. In the present embodiment, the beam divergence angle of the emitted light from the semiconductor laser is 12 degrees. Therefore, the angle $\theta_5$ formed by the direction of the emitted light from the semiconductor laser and the line perpendicular to the side surface of the slider is set to 7°, and an angle $\theta_{10}$ formed by the waveguide core 3 and the side surface of the slider at the entrance of the waveguide is also set to 7°.

Figure 21A:
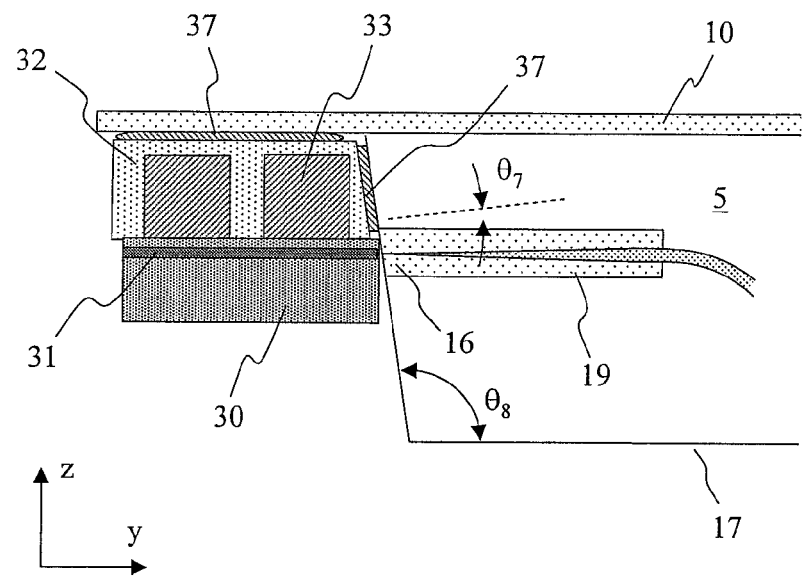
FIGS. 21A and 21B are views each illustrating an example in which the side surface of the slider is obliquely shaved.
Figure 21B:
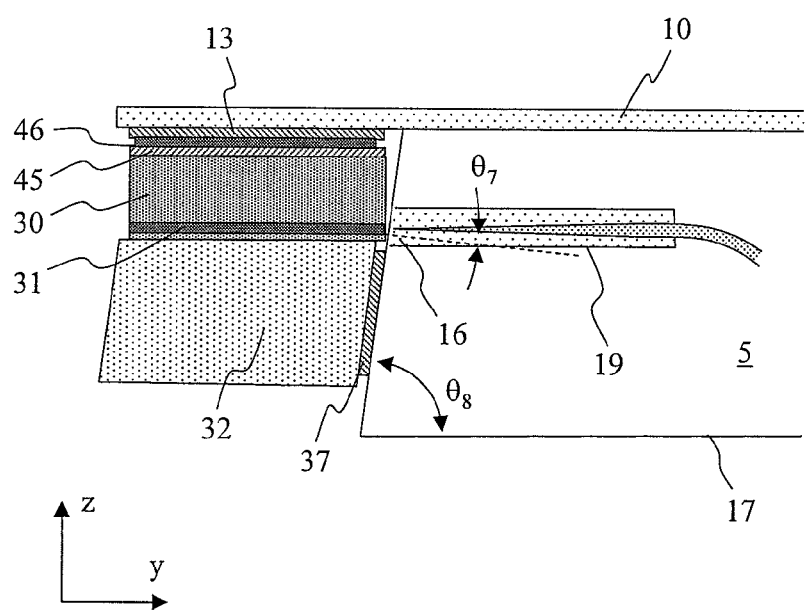

In order to reduce the influence of the reflected light generated on the side surface of the slider, as illustrated in FIGS. 21A and 21B, the side surface of the slider may be slanted with respect to the air bearing surface 17. When the side surface of the slider is slanted as described above, the light reflected by the side surface of the slider does not return into the active layer 31 of the semiconductor laser 30, so that the occurrence of noise due to the return light can be suppressed. FIG. 21A illustrates an embodiment in which the semiconductor laser 30 is placed on the lower side of the sub-mount 32 and the active layer 31 of the semiconductor laser 30 is placed on the surface side in contact with the sub-mount 32 as in the embodiment of FIG. 3. It is preferable that a tilt angle $\theta_7$ of the side surface of the slider, that is, the angle formed by the traveling direction of the emitted light from the semiconductor laser 30 and the normal line to the side surface of the slider be larger than ½ the beam divergence angle (full width at half maximum) of the emitted light from the semiconductor laser 30. In the present embodiment, the beam divergence angle of the emitted light from the semiconductor laser is 12 degrees, and hence the tilt angle $\theta_7$ of the side surface of the slider is set to 7°. In order to make shorter a distance between the light emitting position of the semiconductor laser and the side surface of the slider, it is preferable that an angle $\theta_8$ of the slider 5 be larger than 90 degrees (a relation that $\theta_8=\theta_7+90°$ is established). Otherwise, an end of the semiconductor laser 30 collides against the side surface of the slider, so that the distance between the light emitting position and the side surface of the slider becomes larger. As a result, an amount of the light coupled to the waveguide 3 decreases. In addition, in order to keep small the interval between the sub-mount 32 and the side surface of the slider 5, the side surface of the sub-mount on the slider side is also slanted. If the interval between the sub-mount 32 and the side surface of the slider 5 becomes larger, the heat inside of the sub-mount 32 is transmitted to the slider 5 less easily, so that the rise in temperature of the semiconductor laser 30 increases. FIG. 21B illustrates an embodiment in which the semiconductor laser 30 is placed on the upper side of the sub-mount 32 and the active layer 31 of the semiconductor laser 30 is placed on the surface side in contact with the sub-mount 32 as in the embodiment of FIGS. 13A and 13B. In this case, in order to make shorter the distance between the light emitting position of the semiconductor laser 30 and the side surface of the slider, it is preferable that the angle $\theta_8$ of the slider 5 be smaller than 90 degrees (a relation that $\theta_8=90°-\theta_7$ is established). In the present embodiment, the beam divergence angle of the emitted light from the semiconductor laser is 12 degrees, and hence the tilt angle $\theta_7$ of the side surface of the slider is set to 7° ($\theta_8=83°$).

Figure 22A:
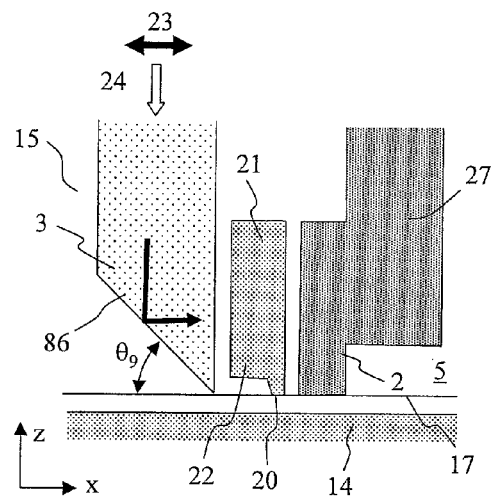
FIGS. 22A to 22C are views each illustrating an example in which a terminal end part of the waveguide is slanted.

There is a possibility that the reflected light which returns to the semiconductor laser is also generated at a terminal end part 86 of the waveguide 3. In order to prevent the reflected light in this case from returning to the semiconductor laser, as illustrated in FIG. 22A, the terminal end part 86 may be slanted. With this configuration, the light reflected by the terminal end part 86 does not travel toward the entrance 16 of the waveguide, and thus does not return to the semiconductor laser. In the present embodiment, an angle $\theta_9$ of the terminal end part 86 of the waveguide is set to 5 to 10°.

In the case where the terminal end part 86 of the waveguide 3 is slanted as described above, the angle $\theta_9$ of the terminal end part may be further increased so that light is totally reflected by the terminal end part 86. That is, assuming that the refractive index of the waveguide core 3 is $n_1$ and the refractive index of the cladding is $n_2$, if the angle $\theta_9$ of the terminal end part of the waveguide satisfies the following expression:

$$\theta_9 > \sin^{-1}(n_2/n_1)$$

the light is totally reflected by the terminal end part, and then travels in the lateral direction. In the case where the terminal end part of the waveguide is not slanted, part of the light inside of the waveguide, which is not converted into an optical near-field, is radiated to the surface of the magnetic recording medium 14, whereby a wide range of the magnetic recording medium 14 is heated. In contrast to this, when the light is totally reflected by the terminal end part 86 of the waveguide, the light does not travel toward the magnetic recording medium 14, and hence it is possible to prevent the emitted light from the waveguide from heating the magnetic recording medium 14. In the present embodiment, the waveguide core is made of $Ta_2O_5$ having a refractive index of 2.18, and the cladding is made of $Al_2O_3$ having a refractive index of 1.63. Therefore, an angle of the total reflection is $\theta_9=48.4°$, and the angle $\theta_9$ of the terminal end part of the waveguide is set to 50° so as to be larger than 48.4°.

Figure 22B:
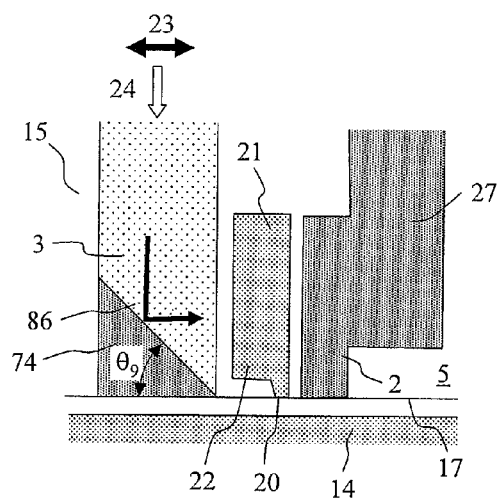

As illustrated in FIG. 22B, a portion 74 made of a material having a refractive index smaller than that of the cladding 15 may be formed in the terminal end part of the waveguide. With this configuration, it is possible to make smaller the angle $\theta_9$ of the terminal end part of the waveguide which is necessary to cause the total reflection. That is, a range of the angle of the total reflection becomes wider, so that a processing error can be less influential. In the present embodiment, the portion 74 having the small refractive index is made of $SiO_2$ having a refractive index of 1.45 or $MgF_2$ having a refractive index of 1.38, and the angle $\theta_9$ of the terminal end part is set to 45°.

Figure 22C:
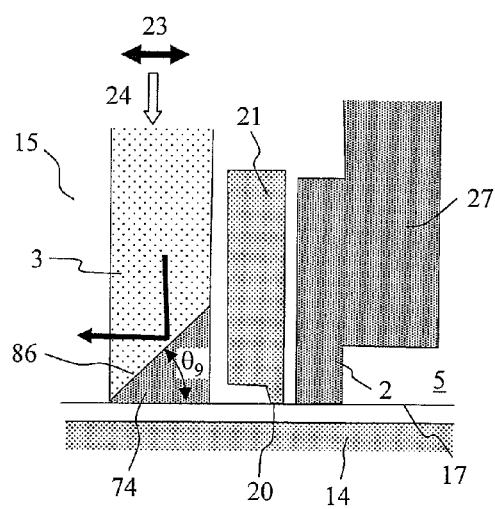

In the case where the terminal end part of the waveguide is slanted, in the above-mentioned embodiment, the reflected light is caused to travel toward the optical near-field generating element 1. In this case, part of the reflected light is converted into an optical near-field, and hence it is possible to enhance the generation efficiency of the optical near-field. However, if an amount of the light which reaches the optical near-field generating element to be scattered or reflected is large, there is a possibility that this light returns to the semiconductor laser to cause return light noise. In such a case, in order to remove the return light noise, as illustrated in FIG. 22C, the reflected light may be caused to travel toward the opposite side to the optical near-field generating element 1. With this configuration, it is possible to prevent the light returning from the optical near-field generating element 1 from entering the semiconductor laser.

Figure 23:
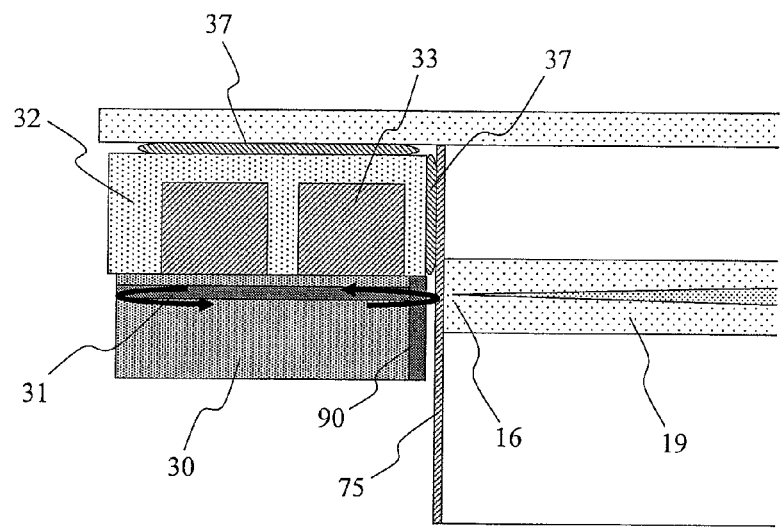
FIG. 23 is a view illustrating an example in which a reflectance on the side surface of the slider is increased, and a reflectance on a light emitting end surface of the semiconductor laser is reduced.

In the case as illustrated in FIGS. 2A and 2B where the emitted light from the semiconductor laser perpendicularly enters the side surface of the slider, a reflectance at the light emitting end of the semiconductor laser, that is, a reflectance of the light reflected by the end surface of the semiconductor laser toward the inside of the semiconductor laser may be made smaller than the reflectance on the side surface of the slider. For example, in an embodiment illustrated in FIG. 23, a reflective layer 75 of a metal film or a dielectric multilayer film is formed on the side surface of the slider, and the anti-reflective coating 90 is formed on the light emitting end surface of the semiconductor laser. A reflectance of the anti-reflective coating 90 on the surface of the semiconductor laser is set to be equal to or smaller than 5%, and a reflectance of the reflective layer 75 on the side surface of the slider is set to 30 to 50%. With this configuration, light is mainly repeatedly reflected (resonated) between the side surface of the slider 5 and the surface opposite to the light emitting end of the semiconductor laser 30. Accordingly, it is substantively possible to make a position of the light emitting end of the semiconductor laser 30 coincident with a position of the side surface of the slider. That is, the distance between the semiconductor laser and the slider can be made substantively 0, and hence it is possible to enhance the coupling efficiency between the emitted light from the semiconductor laser 30 and the waveguide 3. In the above-mentioned embodiment, the reflectance at the light emitting end of the semiconductor laser is reduced by forming the anti-reflective coating on the surface of the semiconductor laser. Alternatively, as illustrated in FIG. 20A, the resin 70 having the refractive index larger than 1 is sealed between the semiconductor laser and the side surface of the slider, whereby the reflectance at the light emitting end of the semiconductor laser may be reduced.

Figure 25A:
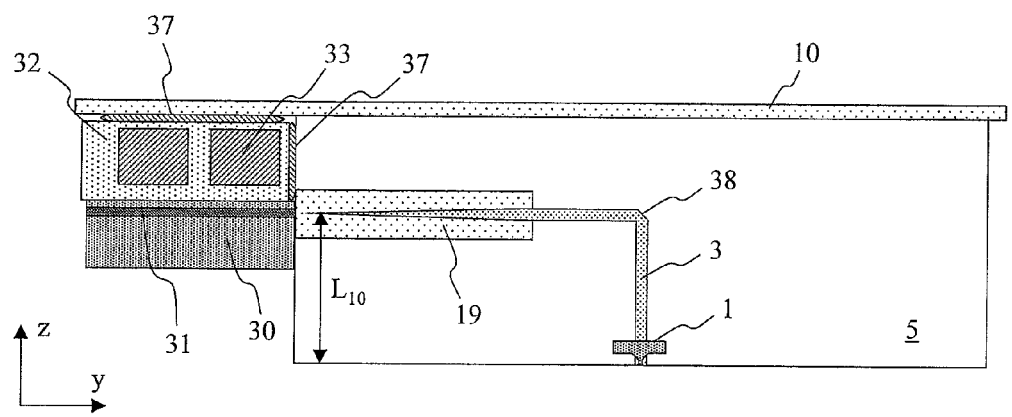
FIGS. 25A to 25C are views each illustrating an example in which a reflective mirror is formed in the middle of the waveguide.
Figure 25B:
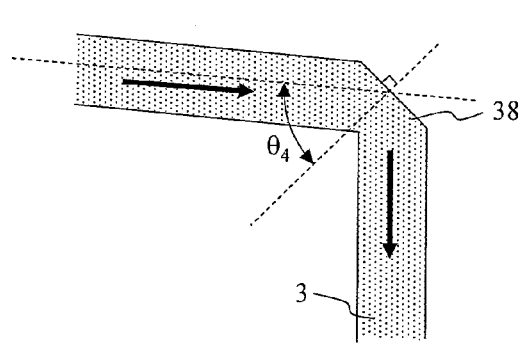
Figure 25C:
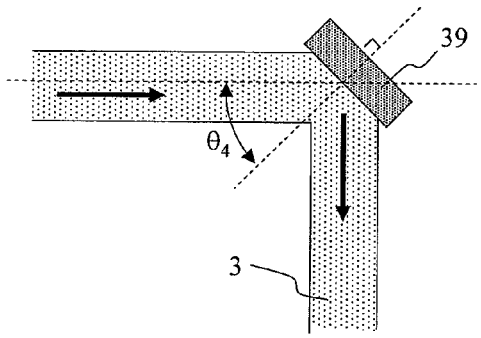

In the above-mentioned embodiment, the curved line part is provided in the middle of the waveguide 3, whereby the orientation of the waveguide 3 is changed. Alternatively, as illustrated in FIG. 25A, a reflective mirror 38 is formed in the middle of the waveguide 3, whereby the orientation of the waveguide 3 may be changed. As illustrated in FIG. 25B, such a mirror that makes an incidence angle $\theta_4$ of the entering light with respect to a reflection surface of the reflective mirror 38 equal to or larger than a total reflection angle is used as the reflective mirror. In addition, as illustrated in FIG. 25C, a film 39 made of metal or a material having a refractive index smaller than that of the cladding 15 may be formed on the reflection surface of the reflective mirror. With this configuration, it is possible to change the orientation of the waveguide 3 more suddenly. That is, in the case of using the film made of the material having the smaller refractive index, the incidence angle $\theta_4$ necessary for the total reflection can be made smaller. In the present embodiment, a material such as gold, aluminum, silver, or copper is used as the metal, and a material such as $SiO_2$ or $MgF_2$ is used as the material having the smaller refractive index.

Figure 26A:
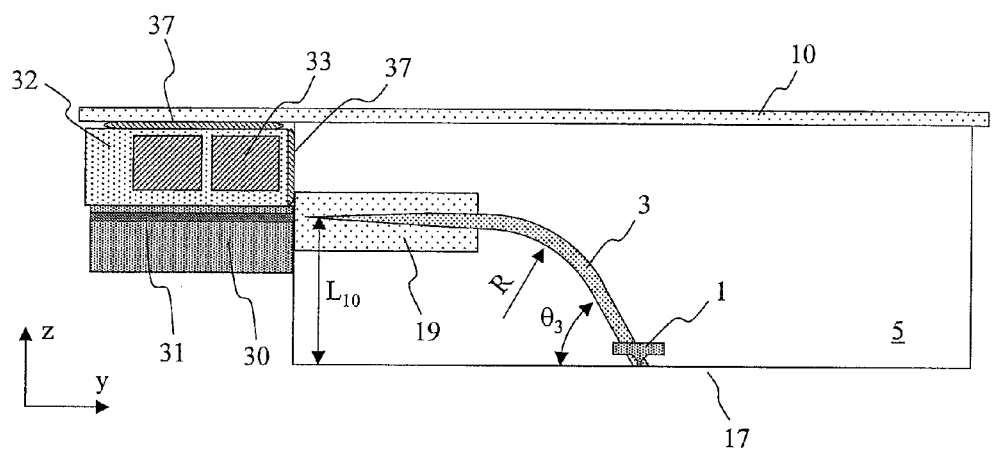
FIGS. 26A to 26C are views each illustrating an example in which the waveguide obliquely enters the optical near-field generating element.
Figure 26B:
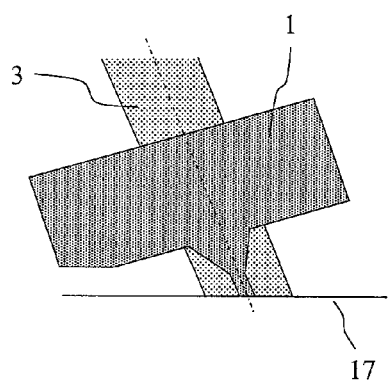
Figure 26C:
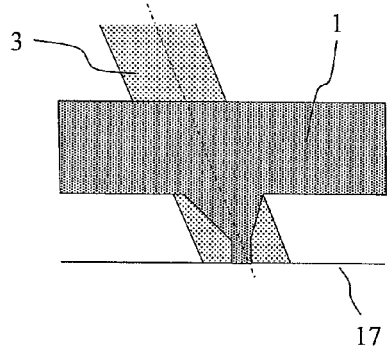

In the above-mentioned embodiment, the orientation of the central axis of the waveguide 3 (the traveling direction of light) is set to be perpendicular to the slider air bearing surface near the optical near-field generating element 1 in the terminal end part of the waveguide. Alternatively, as illustrated in FIGS. 26A to 26C, the orientation of the central axis of the waveguide 3 may be slanted with respect to the slider air bearing surface 17. That is, an angle formed by the central axis of the waveguide and a normal line to the slider air bearing surface 17 may be set to be larger than 0. With this configuration, the light propagating through the waveguide 3 obliquely enters the slider air bearing surface 17, and hence the light reflected by the slider air bearing surface 17 does not return to the light entrance side of the waveguide 3. Accordingly, it is possible to reduce the return light noise of the semiconductor laser 30. In addition, when the orientation of the central axis of the waveguide 3 is slanted as described above, the distance $L_{10}$ between the slider air bearing surface 17 and the entrance of the waveguide can be made smaller than the radius of curvature R of the curved line part. Accordingly, in the case where the semiconductor laser is placed as illustrated in FIG. 3, the thickness $L_9$ of the thinner portion of the sub-mount can be made larger. As a result, the heat from the semiconductor laser 30 can be dissipated to the sub-mount 32 more easily, and hence it is possible to reduce the rise in temperature of the semiconductor laser 30. In the present embodiment, for the purpose of simply reducing the reflection by the air bearing surface 17, an orientation $\theta_3$ of the waveguide near the optical near-field generating element 1 is set to 80 degrees. On the other hand, for the purpose of increasing the thickness of the sub-mount 32, the orientation $\theta_3$ of the waveguide near the optical near-field generating element 1, the radius of curvature of the curved line part, and the distance $L_{10}$ to the entrance of the waveguide are set to 60°, 100 μm, and 80 μm, respectively.

When the traveling direction of the light inside of the waveguide near the optical near-field generating element is slanted with respect to the slider air bearing surface as described above, the optical near-field generating element 1 may have a left-right asymmetrical shape as illustrated in FIGS. 26B and 26C. In these embodiments, the metal structure 1 is slanted to the light entrance side of the waveguide. When the traveling direction of the light inside of the waveguide is slanted with respect to the slider air bearing surface 17, surface plasmons excited in the metal structure 1 propagate in the same direction as the traveling direction of the light inside of the waveguide. When the metal structure 1 is also slanted as in these embodiments, the surface plasmons traveling in an oblique direction concentrate on the leading end part 20 more easily, which makes it possible to increase the optical near-field intensity.

Figure 27:
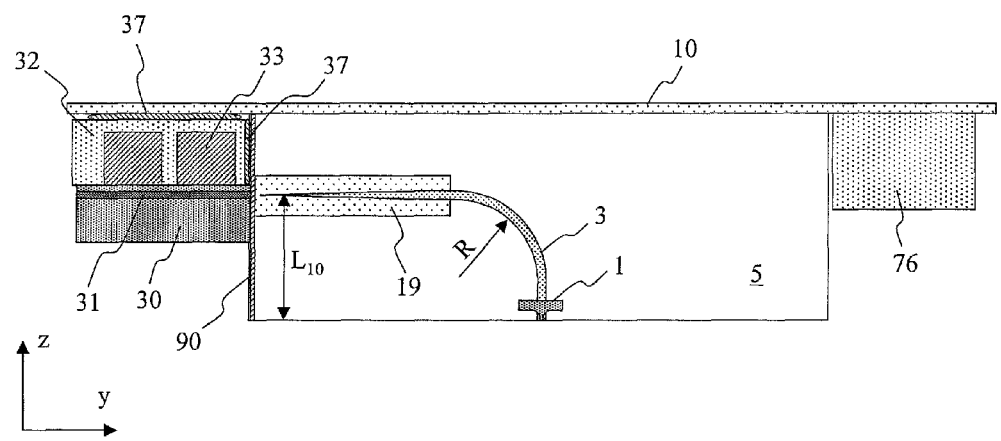
FIG. 27 is a view illustrating an example in which a weight is put on an opposite side surface of the slider to the surface on which the semiconductor laser is placed.

In the above-mentioned embodiment, when the semiconductor laser 30 and the sub-mount 32 are placed on one side surface of the slider, if the one side accordingly becomes heavier to thereby make the floating of the slider unstable, as illustrated in FIG. 27, a weight 76 may be placed on the opposite side surface of the slider in order to balance the weight. The weight and position of the weight 76 are adjusted so that the center of gravity of the entire structure is located at the center.

The intensity of the output light from the semiconductor laser 30 fluctuates when environmental temperature changes. In addition, if the drive is used over a long term, the output intensity is gradually reduced by degradation of the semiconductor laser 30. In addition, the position of the semiconductor laser 30 with respect to the waveguide 3 may be changed by the change in environmental temperature or a long-term use. There is a possibility that these factors fluctuate the intensity of the light coupled inside of the waveguide 3. If the light intensity fluctuates, the rise in temperature of the magnetic recording medium changes, so that stable recording becomes difficult. In order to solve the problem described above, as illustrated in FIGS. 28A to 28D, a second waveguide for monitoring the power of the light inside of the waveguide 3 may be formed in the slider.

In an embodiment of FIGS. 28A to 28D, a waveguide 43 for power monitoring is placed in a region in which the evanescent light around the waveguide core 3, that is, the light which is generated at the interface between the core and the cladding so as to seep from the cladding is generated. When the waveguide 43 is placed as described above, part of evanescent light components contained in the light being transmitted through the waveguide 3 is coupled to the waveguide 43. The light transmitted to the waveguide 43 for power monitoring is detected by a light detector 40 which is placed on the opposite side to the semiconductor laser 30. A feedback circuit is formed for increasing a current fed to the semiconductor laser 30 when the amount of light is small, and reducing the current fed to the semiconductor laser 30 when the amount of light is large, on the basis of the intensity of the light detected by the light detector 40. The intensity of the light coupled to the waveguide 43 for power monitoring depends on a distance D between the main waveguide 3 and the waveguide 43 for power monitoring and a length (coupling length) $L_{11}$ of a portion in which the two waveguides overlap with each other. In the present embodiment, the distance D and the coupling length $L_{11}$ are optimized, and the intensity of the light coupled to the waveguide 43 is set to 1 to 10% of the intensity of the light of the main waveguide 3. For example, a width of the waveguide 43, the distance D between the two waveguides, and the coupling length $L_{11}$ are set to 300 nm×500 nm, 250 nm, and 1.5 µm, respectively.

Figure 28A:
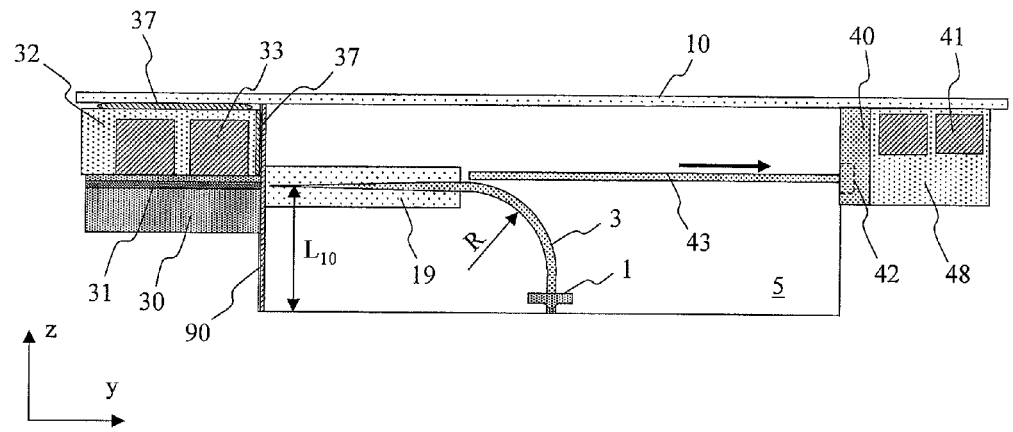
FIGS. 28A to 28D are views each illustrating an example in which a waveguide for light power monitoring is formed.
Figure 28B:
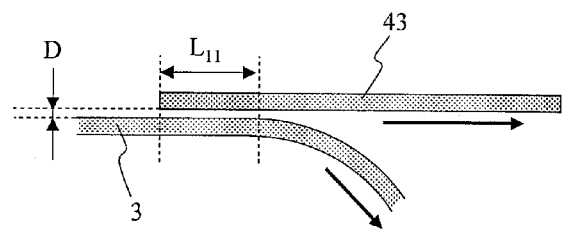
Figure 28C:
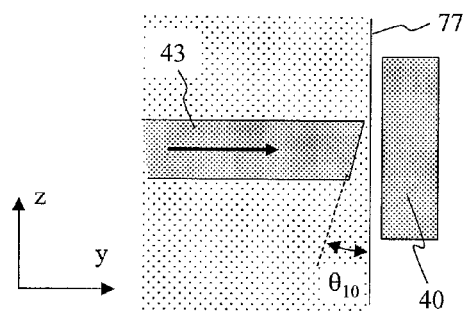
Figure 28D:
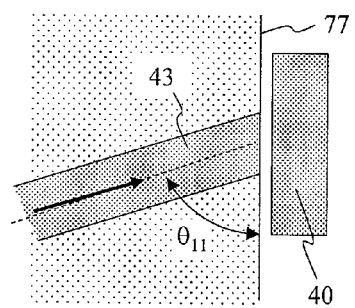

In order to prevent the reflected light from traveling back toward the semiconductor laser 30 in a terminal end part of the waveguide 43, as illustrated in FIG. 28C, an end surface of the waveguide 43 is slanted with respect to a side surface 77 of the slider, and alternatively, as illustrated in FIG. 28D, the orientation of the waveguide 43 is changed in the middle thereof, to thereby cause light to obliquely enter the side surface 77 of the slider. In the case as illustrated in FIG. 28C where the end surface is slanted, the angle $\theta_{10}$ of the terminal end part is set to 5 to 10°. In the case as illustrated in FIG. 28D where the waveguide 43 is placed so as to be slanted with respect to the side surface 77 of the slider, an angle $\theta_{11}$ formed by a central line of the waveguide 43 and the side surface 77 of the slider is set to 80 to 85°. Any detector can be used as the light detector 40 as long as the detector can convert light into an electrical signal, and in the present embodiment, a photodiode is used as the light detector 40. The photodiode is placed next to a mount 48 for the photodiode. Electrodes 41 are formed on the mount 48 for the photodiode, and the electrodes 41 and electrodes of the photodiode are bonded to each other. The photodiode 40 and the mount 48 therefor are attached to the side surface of the slider 5 or the flexure 10. The electrodes 41 on the mount for the photodiode are connected to wiring 44 for the photodiode on the flexible printed circuit according to the same method as the method of connecting the electrodes for the laser and the wiring as illustrated in FIG. 3.

In the above-mentioned embodiment, the electrodes of the photodiode are connected to the wiring 44 for the photodiode via the electrodes 41 on the mount 48 for the photodiode, but may be directly connected to the wiring 44 for the photodiode without the intermediation of the mount for the photodiode. In an embodiment of FIG. 29, a substrate of the photodiode 40 is directly attached to the side surface of the slider. At this time, a light receiving surface 42 is located in the terminal end part of the waveguide 43. The size of the light receiving surface is set to be sufficiently larger than a light spot at the exit of the waveguide so that the position adjustment of the photodiode is facilitated. In the present embodiment, the size of the light receiving surface 42 is set to 50 µm in the z direction and 70 µm in the x direction. The wiring 44 is connected to the electrodes 41 formed on the substrate of the photodiode 40. The electrodes 41 are connected to the wiring 44 by using the solder or the electrically conductive adhesive 46.

Figure 29:
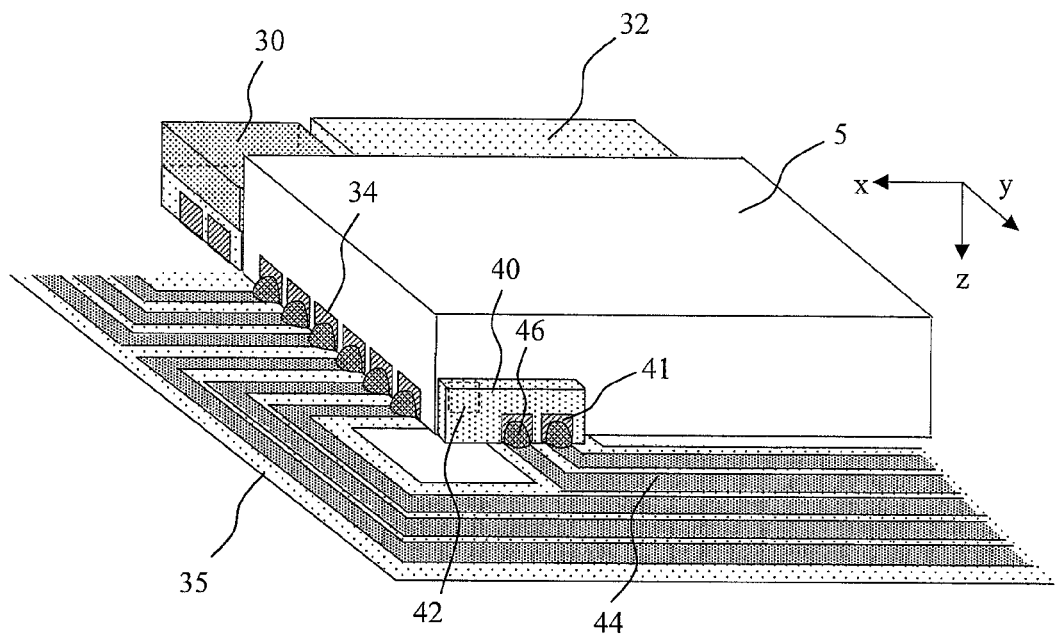
FIG. 29 is a view illustrating a method of placing a light detector for light power monitoring, and illustrating an example in which electrodes of the light detector are placed on a side surface of the light detector.
Figure 30:
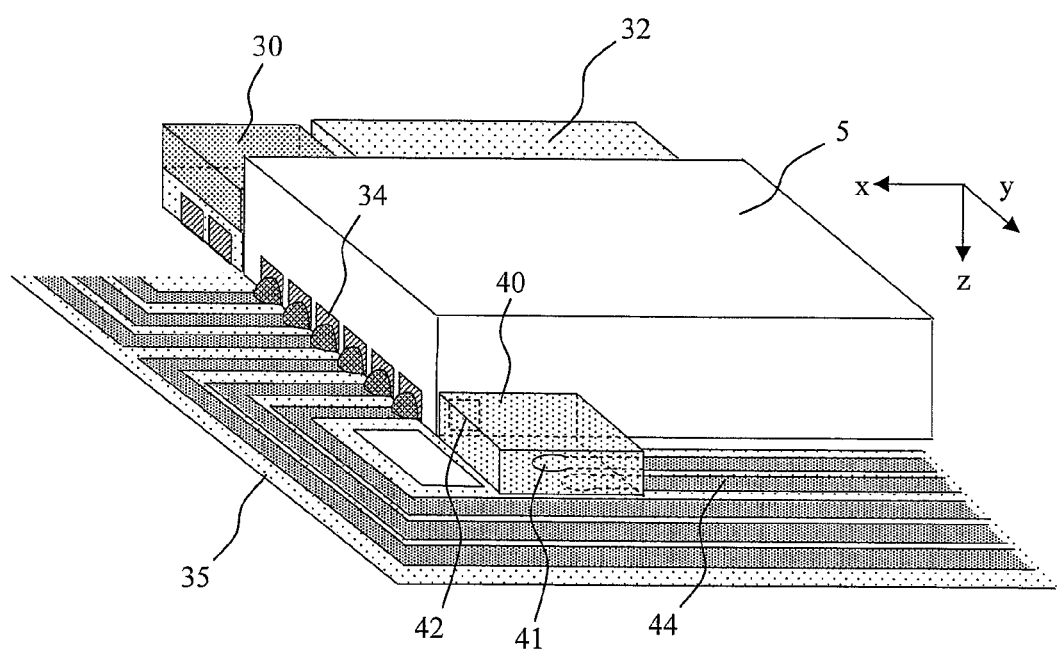
FIG. 30 is a view illustrating the method of placing the light detector for light power monitoring, and illustrating an example in which the electrodes of the light detector are placed on a bottom surface of the light detector.

The photodiode 40 may be integrated on the flexible printed circuit 35 on the suspension. With this configuration, a step of attaching the photodiode to the side surface of the slider can be omitted, and hence it is possible to reduce the assembly time and costs. In the present embodiment, a photodiode element having a side surface on which the electrodes 41 are formed as illustrated in FIG. 29 or a photodiode element having a surface in contact with the flexible printed circuit 35 on which the electrodes 41 are formed as illustrated in FIG. 30 is fixed to the flexible printed circuit. The electrodes 41 of the photodiode and the wiring 44 are connected to each other by the solder or the conductive adhesive agent.

Figure 31:
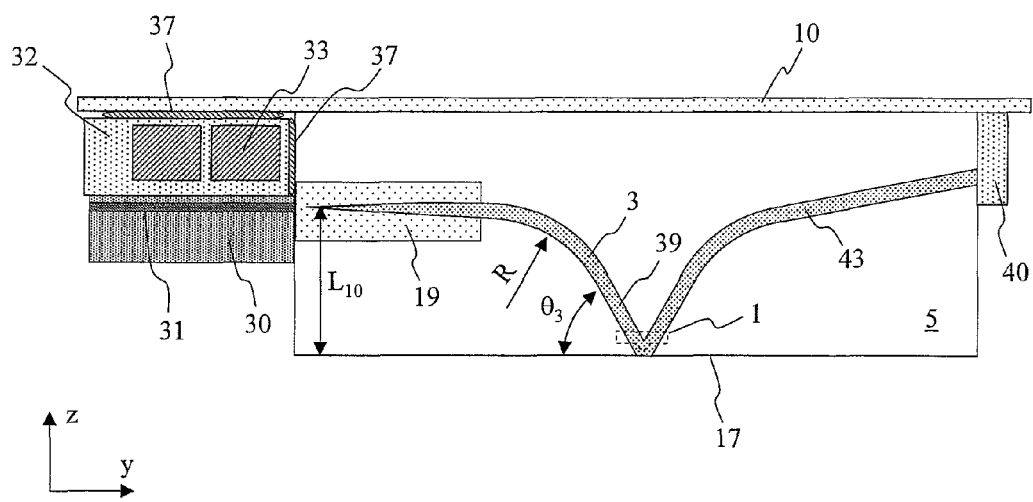
FIG. 31 is a view illustrating an example in which a central axis of a waveguide for introducing light to the optical near-field generating element is slanted with respect to the air bearing surface, and the light reflected by the terminal end part of the waveguide is detected by the waveguide for light power monitoring.

In the above-mentioned embodiment, the waveguide for power monitoring is formed by bifurcating the waveguide 3 for introducing light to the optical near-field generating element 1 in the middle thereof. Alternatively, as illustrated in FIG. 31, the waveguide 3 for introducing light to the optical near-field generating element 1 may be placed so that light obliquely enters the slider air bearing surface 17, and the waveguide 43 for power monitoring may guide the light reflected by the slider air bearing surface 17 to the light detector 40. With this configuration, it is not necessary to bifurcate the waveguide 3 for introducing light to the optical near-field generating element 1 in the middle thereof, and hence the amount of the light introduced to the optical near-field generating element 1 can be increased, to thereby enhance the light utilization efficiency.

In a head manufacturing process, it is preferable to test the performance of the optical near-field generating element and the magnetic head after the processing of the slider and before the attachment of the semiconductor laser. In the case where a manufacturing yield of the optical near-field generating element and the magnetic head is not 100%, if the semiconductor laser is assembled without performing such testing, the semiconductor laser ends up being discarded when the performance of the optical near-field generating element and the magnetic head is low, which leads to an increase in costs. It is preferable that the testing of the element be performed by actually floating the slider above the medium for performing recording and reproduction. For this testing, it is necessary to introduce light from the outside to the waveguide with the slider being floated.

Figure 32A:
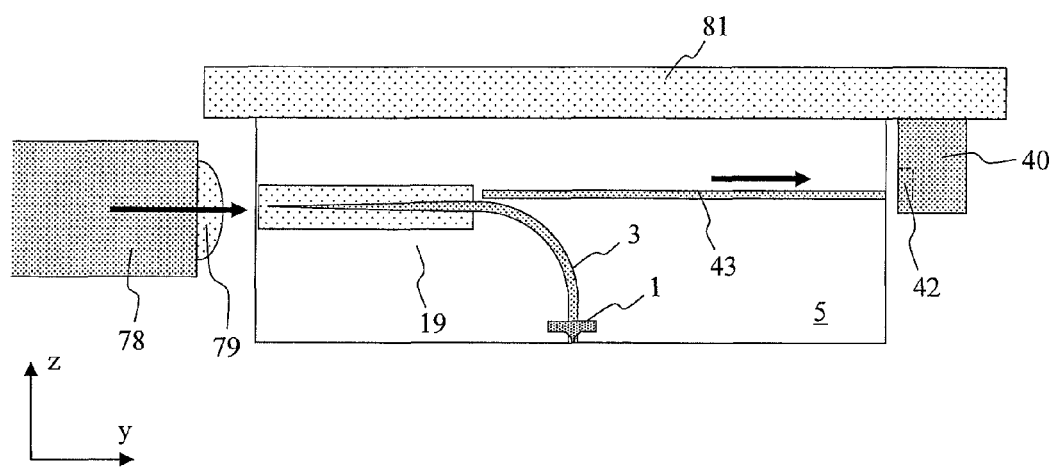
FIGS. 32A and 32B are views each illustrating an optical system for a head inspection apparatus.
Figure 32B:
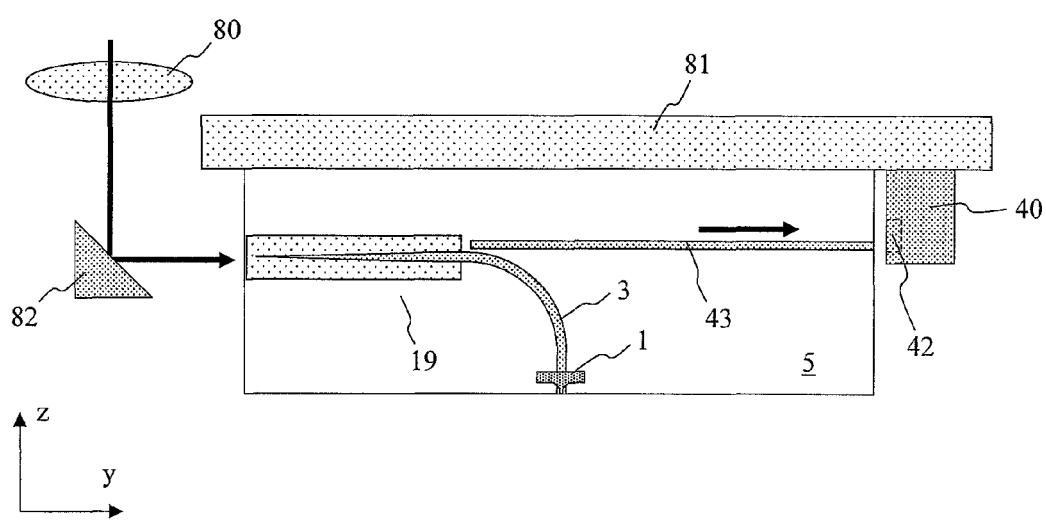

FIGS. 32A and 32B each illustrate an optical system of an inspection system used for head performance evaluation. FIG. 32A illustrates an embodiment in which light is introduced by using an optical fiber 78. The optical fiber 78 is fixed to an external stage or a member 81 holding the slider during the testing. A minute microlens 79 is formed at a leading end of the optical fiber, whereby the emitted light is converted into parallel light. It should be noted that the emitted light may be collected. The power of the light coupled to the waveguide is monitored by using the waveguide 43 for power monitoring and the light detector (photodiode) 40 placed at the light emitting end of the waveguide 43. In the case of the testing, the photodiode is not fixed to the slider, but is fixed to the external stage or the member 81 holding the slider during the testing. First, a position of the optical fiber is adjusted so that the amount of the light monitored by the light detector 40 becomes largest. Next, the intensity of the laser light to be introduced to the optical fiber is adjusted so that the amount of light has a predetermined value. After that, the recording and reproduction is performed, to thereby evaluate characteristics of the magnetic recording head.

In an embodiment of FIG. 32B, the light from the laser is converted by an objective lens 80 into parallel light or converging light, and the converted light is reflected by a mirror or a prism 82 to be introduced to the waveguide. The objective lens and the mirror are placed on the external stage or the member 81 holding the slider during the testing. In the case where the objective lens and the mirror are placed on the member 81 holding the slider during the testing, the optical axis is adjusted by causing a piezoelectric element or an electrostatic actuator to move the objective lens 80 or the mirror 82.

Figure 33A:
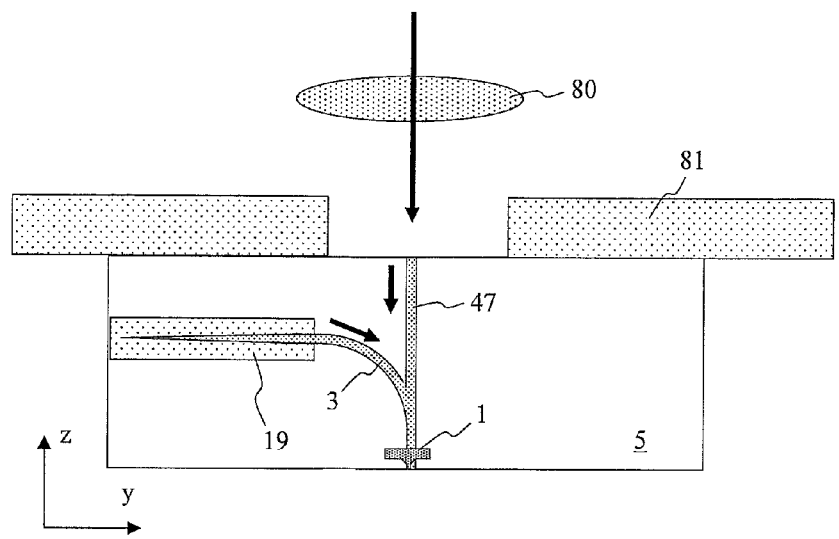
FIGS. 33A to 33C are views each illustrating an example in which a waveguide for head inspection is formed.
Figure 33B:
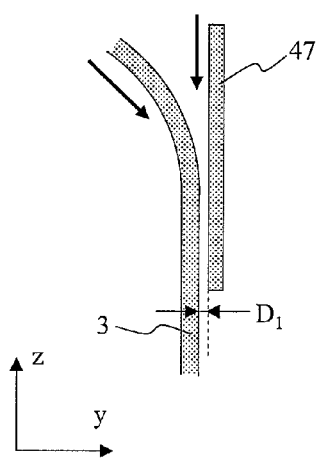
Figure 33C:
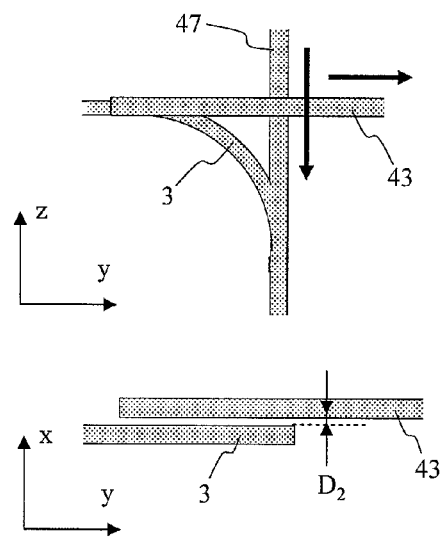

At the time of the performance testing of the head, a waveguide for testing may be formed in the slider in order to enable light to be introduced from the objective lens placed in the slider upper part. FIGS. 33A to 33C each illustrate an embodiment of such a case. A waveguide 47 for introducing the light used for the testing is formed so that the entrance of the waveguide is located on the upper surface of the slider. The waveguide 47 for introducing the light used for the testing is placed so as to overlap, in the middle thereof, with the waveguide 3 for introducing the light from the semiconductor laser placed on the side surface of the slider. In order to allow light to enter from above, a hole is opened in the slider holding member 81, and the light is introduced to the waveguide through this hole. The light entering the waveguide is collected by using the objective lens 80. When the objective lens 80 is placed in the upper part as described above, a distance between the objective lens 80 and the slider 5 can be made smaller, and hence a lens whose working distance is short can be used. Accordingly, an objective lens for a microscope is used as the objective lens, whereby position adjustment between the laser light and the waveguide can be performed while observing the upper surface of the slider at high magnification, to thereby facilitate the position adjustment. The waveguide 47 for testing and the waveguide 3 for introducing the light from the semiconductor laser placed on the side surface of the slider may be placed so as to overlap with each other as illustrated in FIG. 33A, or may be placed so that a distance $D_1$ between the two waveguides is several 10 to several 100 nm as illustrated in FIG. 33B. In the case of FIG. 33B, the evanescent light generated around a core of the waveguide 47 for testing is coupled to the waveguide 3 for introducing the light from the semiconductor laser placed on the side surface of the slider, whereby the light is introduced to the waveguide 3. In addition, in the case where the waveguide 43 for power monitoring is also formed, as illustrated in FIG. 33C, the waveguide 43 for power monitoring and the waveguide 47 for testing may be placed so as to three-dimensionally intersect with each other. In the present embodiment, the waveguide 43 for power monitoring and the waveguide 3 for introducing the light from the semiconductor laser are formed in different layers, and an interval $D_2$ between the two waveguides at a portion at which the two waveguides overlap one above the other is set to 250 nm.

Figure 34:
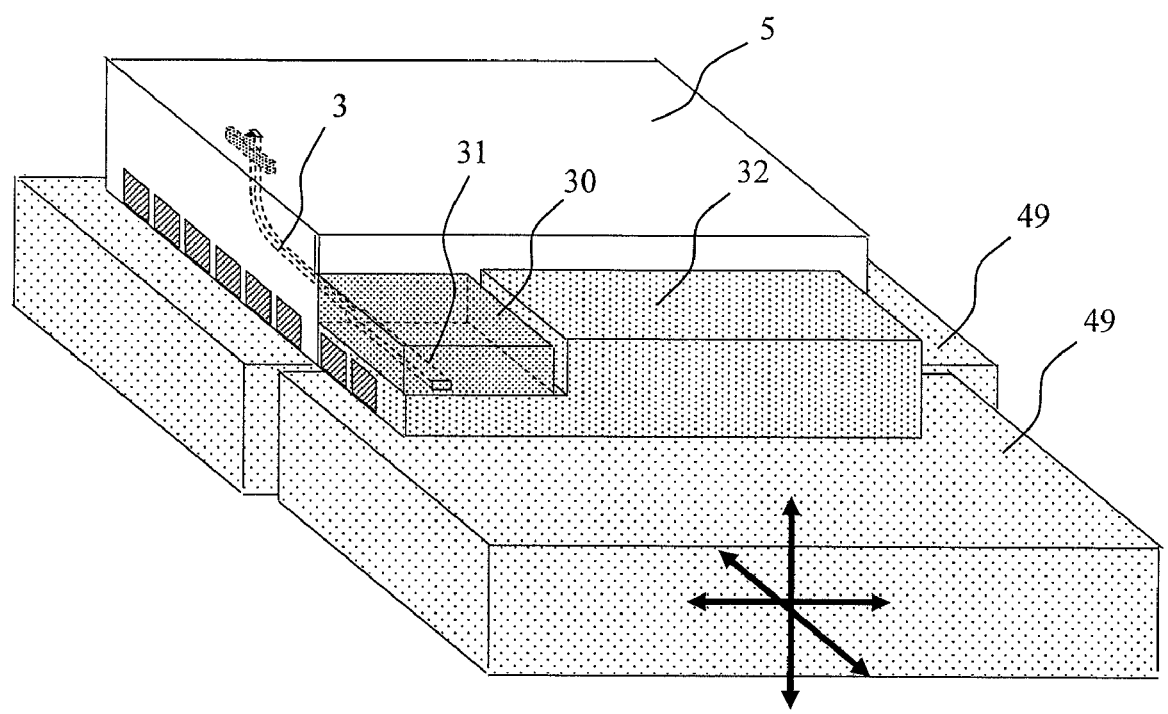
FIG. 34 is a view illustrating an alignment apparatus, and illustrating an example in which passive alignment is performed.
Figure 35A:
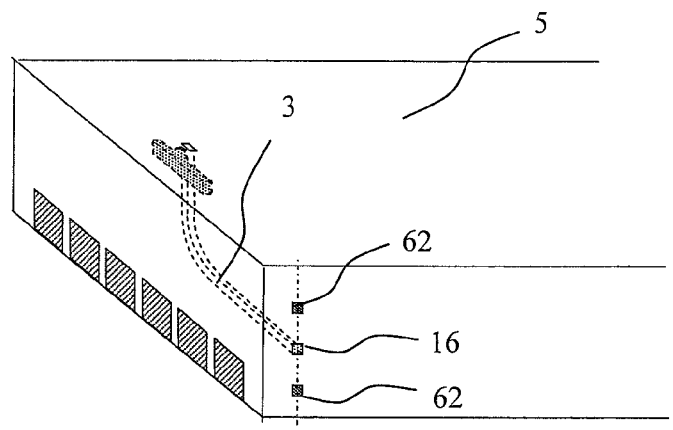
FIGS. 35A to 35C are views each illustrating alignment marks.
Figure 35B:
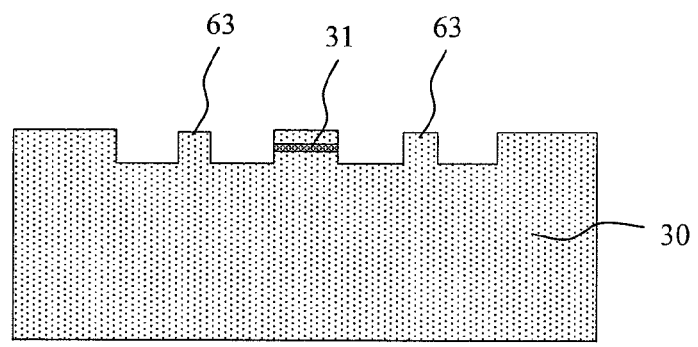
Figure 35C:
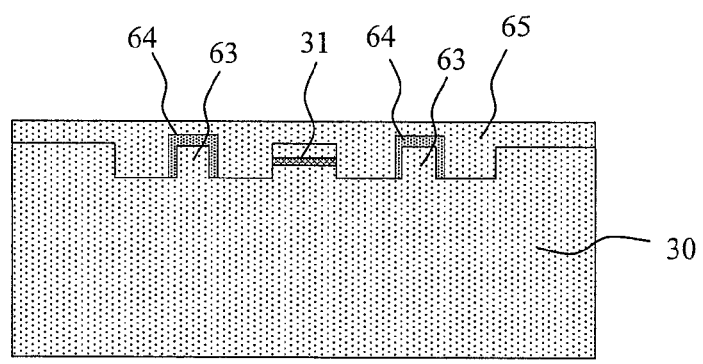

FIG. 34 illustrates an embodiment of an apparatus (alignment apparatus) for attaching the mount 32 on which the semiconductor laser 30 is mounted to the side surface of the slider 5. Each of the sub-mount 32 and the slider 5 is fixed onto a vacuum adsorption stage 49. For position adjustment, as illustrated in FIG. 35A, alignment marks 62 are formed on both sides of the entrance 16 of the waveguide on the side surface of the slider. The alignment marks 62 are formed in the course of processing a recording element or the waveguide on a wafer, and a material which easily reflects or absorbs light, such as Cr, Au, Cu, FeCo, or Si, is used as a material of the alignment marks 62. The alignment marks 62 and the entrance 16 of the waveguide are arranged on the same straight line, and the entrance 16 of the waveguide is located at a middle point between the two alignment marks 62. In addition, as illustrated in FIG. 35B, alignment marks are formed also on the light emitting end surface of the semiconductor laser 30. In the present embodiment, protrusions 63 are formed by etching as the alignment marks on both sides of the active layer. In consideration of characteristics of the semiconductor laser 30, if the protrusions 63 need to be covered by a cover layer 65, a film 64 made of the material which easily reflects or absorbs light, such as Cr, Au, Cu, FeCo, or Si, is formed around the protrusions 63. The active layer 31 is located at a middle point between the two protrusions 63. At the time of the alignment, the alignment marks 62 on the side surface of the slider and the alignment marks on the light emitting end surface of the semiconductor laser 30 are observed by a CCD to check positions thereof, and then the vacuum adsorption stage 49 is moved, whereby positions of the waveguide in the slider 5 and the semiconductor laser 30 are adjusted with each other. A photo-curable or heat-curable electrically conductive adhesive is applied in advance between the slider 5 and the sub-mount, and the adhesive is cured by light radiation or heating after completion of the alignment.

Figure 36:
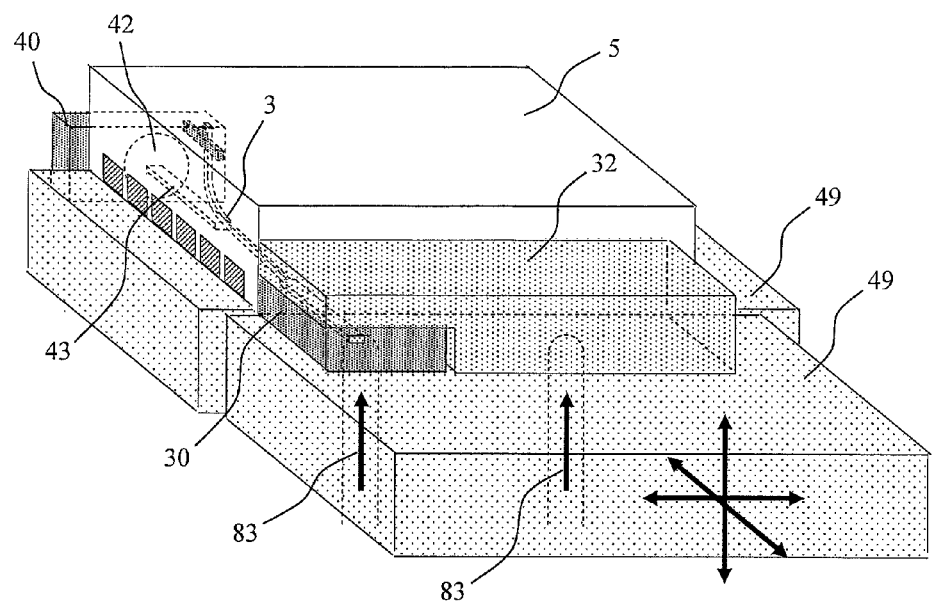
FIG. 36 is a view illustrating an alignment apparatus, and illustrating an example in which active alignment is performed.

When the above-mentioned alignment is being performed, the semiconductor laser may be caused to emit light, and the power of the light introduced to the waveguide may be monitored (active alignment). FIG. 36 illustrates a configuration example of an alignment apparatus therefor. In the present embodiment, the semiconductor laser 30 is mounted on the sub-mount 32 having the structure illustrated in FIGS. 13A and 13B. Each of the sub-mount 32 on which the semiconductor laser 30 is mounted and the slider 5 is fixed onto the vacuum adsorption stage 49. In order to supply a current to the semiconductor laser 30, metal pins 83 are disposed in the vacuum adsorption stage for the sub-mount 32, and are pressed from below against the electrodes on the sub-mount 32 or the electrodes on the semiconductor laser 30. The semiconductor laser 30 is caused to emit light by feeding a current to the pins. In order to monitor the light coupled to the waveguide 3, the waveguide 43 for power monitoring is formed in the slider 5, and the light emitted from the exit of the waveguide 43 is detected by the light detector 40. The vacuum adsorption stage 49 on which the sub-mount 32 is mounted is moved so that the detected light becomes strongest. A photo-curable or heat-curable electrically conductive adhesive is applied in advance between the slider 5 and the sub-mount 32, and the adhesive is cured by light radiation or heating after the completion of the alignment. In the present embodiment, the light detector 40 is placed at the exit of the waveguide 43 for power monitoring. Alternatively, the light detector 40 may detect the light emitted from the exit of the waveguide 3 for introducing light to the optical near-field generating element. In addition, the semiconductor laser may not be caused to emit light during the alignment, the positions may be adjusted by using the alignment marks, and the semiconductor laser may be caused to emit light for inspection after the completion of the alignment. In this case, an apparatus in which the semiconductor laser is caused to emit light after the completion of the alignment and the intensity of the light emitted from the waveguide is equal to or larger than a reference value is regarded as passing.

In the case of using the structure in which the semiconductor laser of the present invention is placed on the side surface of the slider as described above, the sub-mount for the semiconductor laser and the slider are placed respectively on two holders arranged side by side, and then the position adjustment therebetween can be performed. Accordingly, the parts can be easily held, and the time required for the adjustment can be shortened. As a result, the manufacturing costs can be reduced.

Figure 37:
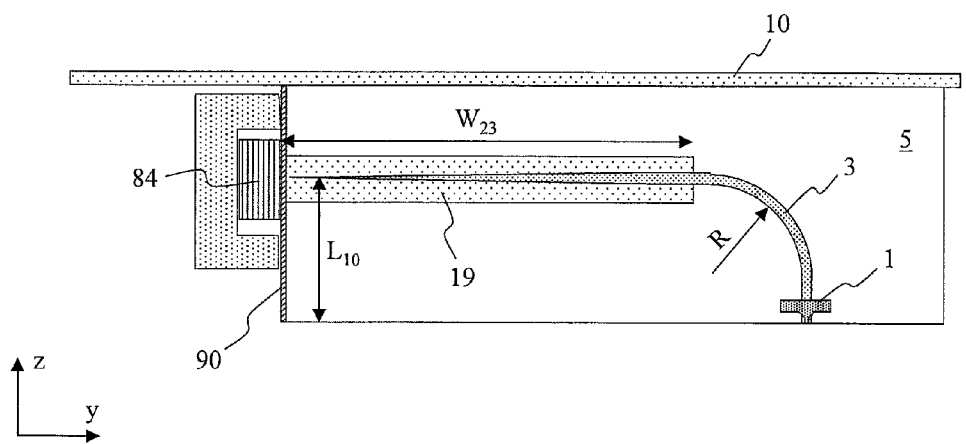
FIG. 37 is a view illustrating an example in which a vertical cavity surface emitting laser is used.

In the above-mentioned embodiment, an edge emitting laser is used as the semiconductor laser. Alternatively, as illustrated in FIG. 37, a vertical cavity surface emitting laser 84 may be used instead. A threshold current of the vertical cavity surface emitting laser is lower than that of the edge emitting laser, and hence the use of the vertical cavity surface emitting laser as described above can reduce power consumption. It should be noted that, for performing recording, the output of the laser needs to be equal to or larger than 10 mW, but in the case of the vertical cavity surface emitting laser, a beam diameter becomes larger (equal to or larger than 10 μm) for obtaining a high output. Accordingly, it is necessary to increase the conversion ratio of the spot size converter. For this purpose, it is necessary to make larger the length $W_{23}$ of the spot size converter. Therefore, in the present embodiment, similarly to the case of FIG. 24, the optical near-field generating element 1 and the magnetic head are placed so as to be brought closer to the opposite side to the side surface of the slider on which the semiconductor laser is placed, to thereby increase the conversion ratio.

Figure 38:
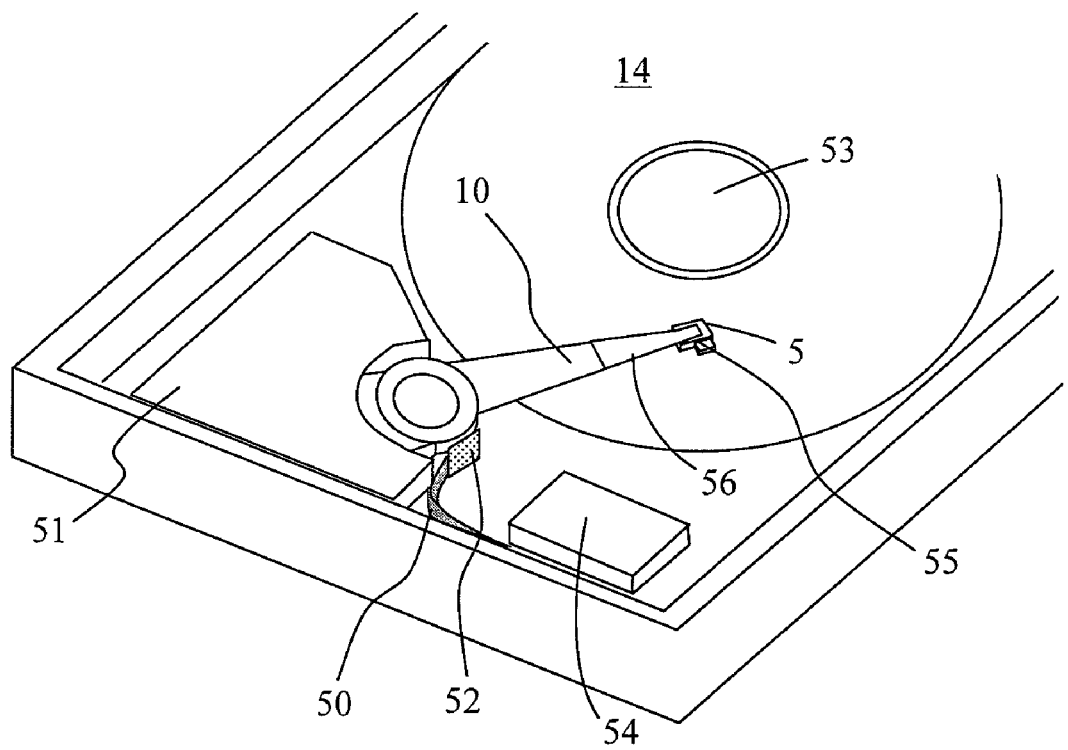
FIG. 38 is a view illustrating a configuration example of a recording and reproducing apparatus.

FIG. 38 is an overall view illustrating a recording apparatus using the magnetic recording head of the present invention. The floating slider 5 is fixed to a suspension 56, and is positioned at a desired track position above a magnetic disk 14 by an actuator formed of a voice coil motor 51. A pad for floating is formed on the surface of the head, and the head is floated above the magnetic disk 14 at a floating amount equal to or smaller than 5 nm. The magnetic disk 14 is fixed to a spindle 53 which is rotationally driven by a motor, and thus is rotated. The semiconductor laser and a sub-mount 55 are placed on the side surface of the slider 5. The semiconductor laser and the sub-mount 55 are placed on an outer circumferential side of the disk so as to avoid colliding against a shaft of the spindle 53. A drive current for the semiconductor laser is supplied via a flexible printed circuit 50, and a drive IC therefor is placed on a circuit board 52. A recording signal is generated by an LSI 54 for signal processing, and the recording signal and power source for the semiconductor laser are supplied to a driver for the semiconductor laser via the flexible printed circuit 50. At the moment of recording, a magnetic field for recording is generated by the coil provided in the floating slider 5, and at the same time, the semiconductor laser is caused to emit light, whereby a recording mark is formed in the recording layer of the magnetic recording medium 14. Data recorded on the magnetic recording medium 14 is reproduced by the magnetic reproducing element (GMR or TMR element) formed in the floating slider 5. A reproduction signal is processed by the signal processing circuit 54.

In addition, each description of symbols is as follows,
  1 optical near-field generating element (metal structure)
  2 main pole
  3 waveguide core
  4 reproducing element
  5 slider
  6 magnetic head
  7 coil
  8 return pole
  9 shield
  10 flexure
  11 load beam
  12 dimple
  13 wiring
  14 magnetic recording medium
  14' recording layer
  15 waveguide cladding
  16 waveguide entrance
  17 air bearing surface
  18 core for spot diameter conversion
  19 spot size converter
  20 vertex at which optical near-field is generated
  21 upper part of metal structure
  22 lower part of metal structure
  25 recess part of scatterer surface
  26 tapered part of metal structure
  27 magnetic pole for transmitting magnetic flux generated by coil
  28 upper part of main pole
  29 side surface of metal structure on waveguide side
  30 semiconductor laser
  31 active layer
  32 sub-mount
  33 electrode for laser
  34 electrode for magnetic head
  35 flexible printed circuit
  36 solder
  37 conductive adhesive agent
  38 mirror
  39 film made of metal or material having refractive index smaller than that of cladding
  40 light detector
  41 electrode for light detector
  42 light receiving surface
  43 waveguide for power monitoring
  44 wiring for photodiode
  45 electrode on semiconductor laser
  46 electrically conductive adhesive or solder
  47 waveguide for testing
  48 mount for photodiode
  49 vacuum adsorption stage
  50 flexible printed circuit for driver
  51 voice coil motor
  52 circuit board for driver
  53 spindle 54 LSI for signal processing
55 semiconductor laser and sub-mount
56 suspension
60 cut-out formed at corner of magnetic pole
61 gap between two vertexes
62 alignment mark
63 protrusion for alignment
64 film formed around protrusion for alignment
65 cover layer
66 side surface of sub-mount
67 electrode formed in step part of sub-mount
68 side surface of sub-mount on opposite side to light emitting end of semiconductor laser
69 terminal end part of waveguide
70 light transmissive resin
71 insulating material
72 wiring exposure portion
73 polyimide
74 low refractive index portion formed in terminal end part of waveguide
75 reflective coating
76 weight
77 side surface of slider
78 optical fiber
79 microlens
80 objective lens
81 slider holding member
82 mirror or prism
83 electrode on vacuum adsorption device
84 vertical cavity surface emitting laser
90 anti-reflective coating

What is claimed is:

1. A head for thermal assisted magnetic recording device, comprising:
   a semiconductor laser; and
   a floating slider, wherein:
   the floating slider includes:
      an optical near-field generating element; and
      a waveguide for guiding emitted light from the semiconductor laser to the optical near-field generating element;
   the semiconductor laser is placed on a side surface of the floating slider;
   an entrance of the waveguide is located on a side of the side surface of the floating slider;
   the emitted light from the semiconductor laser is directly coupled to the entrance of the waveguide; and
   a traveling direction of light inside of the waveguide changes within the floating slider to a direction toward the optical near-field generating element.

2. The head for thermal assisted magnetic recording device according to claim 1, wherein the waveguide includes a curved line part.

3. The head for thermal assisted magnetic recording device according to claim 1, wherein a reflective mirror is formed in a middle of the waveguide.

4. The head for thermal assisted magnetic recording device according to claim 1, wherein the semiconductor laser is one of an edge emitting laser and a vertical cavity surface emitting laser.

5. The head for thermal assisted magnetic recording device according to claim 1, wherein:
   the semiconductor laser is mounted on a sub-mount;
   an electrode for the semiconductor laser is formed on the sub-mount, and is exposed on a side surface of the sub-mount on a trailing side; and
   the electrode which is exposed on the side surface of the sub-mount on the trailing side is connected to wiring for the semiconductor laser.

6. The head for thermal assisted magnetic recording device according to claim 1, wherein:
   the semiconductor laser is mounted on a sub-mount;
   an electrode is formed on one of a surface of the sub-mount and a surface of the semiconductor laser, the surface being opposite to an air bearing surface of the floating slider; and
   the electrode is connected to wiring for the semiconductor laser.

7. The head for thermal assisted magnetic recording device according to claim 6, wherein:
   a flexure part of a suspension is placed on the floating slider; and
   the wiring for the semiconductor laser passes between the floating slider and the flexure part of the suspension.

8. The head for thermal assisted magnetic recording device according to claim 7, wherein:
   one side of the wiring for the semiconductor laser is grounded; and
   the grounded wiring is electrically connected to the floating slider.

9. The head for thermal assisted magnetic recording device according to claim 7, wherein:
   one side of the wiring for the semiconductor laser is grounded; and
   the grounded wiring is electrically connected to the flexure part of the suspension.

10. The head for thermal assisted magnetic recording device according to claim 1, wherein a traveling direction of the emitted light from the semiconductor laser is different from a direction of a normal line to the side surface of the floating slider.

11. The head for thermal assisted magnetic recording device according to claim 10, wherein an angle formed by the traveling direction of the emitted light from the semiconductor laser and the normal line to the side surface of the slider is larger than ½ a beam divergence angle of the emitted light from the semiconductor laser.

12. The head for thermal assisted magnetic recording device according to claim 10, wherein an angle formed by the side surface of the floating slider on which the semiconductor laser is placed and an air bearing surface of the floating slider is different from 90 degrees.

13. The head for thermal assisted magnetic recording device according to claim 1, wherein a gap between the semiconductor laser and the floating slider is filled with a light transmissive resin having a refractive index larger than 1.

14. The head for thermal assisted magnetic recording device according to claim 1, wherein a terminal end surface of the waveguide is non-parallel to an air bearing surface of the floating slider.

15. The head for thermal assisted magnetic recording device according to claim 1, wherein a terminal end surface of the waveguide totally reflects light.

16. The head for thermal assisted magnetic recording device according to claim 1, wherein an angle formed by a central axis of the waveguide and a normal line to an air bearing surface of the floating slider near an exit of the waveguide is larger than 0.

17. The head for thermal assisted magnetic recording device according to claim 1, wherein:
   the floating slider further includes a second waveguide;
   part of the light being transmitted through the waveguide for guiding the emitted light from the semiconductor laser to the optical near-field generating element is coupled to the second waveguide; and a light detector for detecting light emitted from the second waveguide is placed on a side surface opposite to the side surface of the floating slider on which the semiconductor laser is placed.

18. The head for thermal assisted magnetic recording device according to claim 1, wherein:

the floating slider further includes a second waveguide;

reflected light which is reflected by a terminal end part of the waveguide for guiding the emitted light from the semiconductor laser to the optical near-field generating element is coupled to the second waveguide; and a light detector for detecting light emitted from the second waveguide is placed on a side surface opposite to the side surface of the floating slider on which the semiconductor laser is placed.

19. The head for thermal assisted magnetic recording device according to claim 17, wherein:

a suspension on which a flexible printed circuit is formed is attached to the floating slider; and the light detector is integrated on the flexible printed circuit.

20. A magnetic recording apparatus, comprising:

a magnetic recording medium;

a rotation unit for rotating the magnetic recording medium;

a head for thermal assisted magnetic recording device for applying a recording magnetic field to the magnetic recording medium and for radiating an optical near-field; and a head drive unit for driving the head for thermal assisted magnetic recording device to a desired position above the magnetic recording medium, wherein:

the head for thermal assisted magnetic recording device includes a semiconductor laser and a floating slider;

the floating slider includes:

an optical near-field generating element; and a waveguide for guiding emitted light from the semiconductor laser to the optical near-field generating element;

the semiconductor laser is placed on a side surface of the floating slider;

an entrance of the waveguide is located on a side of the side surface of the floating slider;

the emitted light from the semiconductor laser is directly coupled to the entrance of the waveguide; and a traveling direction of light inside of the waveguide changes within the floating slider to a direction toward the optical near-field generating element.

* * * * *